United States Patent
Nakagawa et al.

(10) Patent No.: US 10,445,612 B2
(45) Date of Patent: Oct. 15, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Masashi Nakagawa, Kawasaki (JP); Keiichi Sawada, Kawasaki (JP); Akifumi Tanaka, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/332,985

(22) Filed: Oct. 24, 2016

(65) Prior Publication Data

US 2017/0116789 A1 Apr. 27, 2017

(30) Foreign Application Priority Data

Oct. 26, 2015 (JP) .................................. 2015-209843
Jan. 20, 2016 (JP) .................................. 2016-008941

(51) Int. Cl.
| | |
|---|---|
| *G06T 19/20* | (2011.01) |
| *G06K 9/46* | (2006.01) |
| *G06T 15/80* | (2011.01) |
| *G06T 19/00* | (2011.01) |
| *G06T 7/70* | (2017.01) |
| *G06T 7/40* | (2017.01) |

(Continued)

(52) U.S. Cl.
CPC ....... *G06K 9/4652* (2013.01); *G06K 9/00375* (2013.01); *G06T 7/11* (2017.01); *G06T 7/73* (2017.01); *G06T 2207/10024* (2013.01); *G06T 2207/10028* (2013.01); *G06T 2207/20081* (2013.01)

(58) Field of Classification Search
CPC .... G09G 5/02; G09G 5/06; G09G 2320/0666; G09G 2320/0626; G09G 3/2003; G09G 5/14; G09G 2340/10; G09G 2340/125; G06T 11/001; G06T 11/60; G06Q 30/02; H04N 5/44504

See application file for complete search history.

(56) References Cited

U.S. PATENT DOCUMENTS 6,002,408 A * 12/1999 Long .................... G06T 11/001
345/592
8,259,129 B2 * 9/2012 Klassen ............... G06T 11/001
345/581

(Continued)

FOREIGN PATENT DOCUMENTS

| JP | 3118915 B2 | 12/2000 |
|---|---|---|
| JP | 2005-228140 A | 8/2005 |
| JP | 2007-257087 A | 10/2007 |

*Primary Examiner* — Todd Buttram
(74) *Attorney, Agent, or Firm* — Canon U.S.A., Inc. IP Division

(57) ABSTRACT

An information processing apparatus includes an effective range acquisition unit configured to acquire an effective range of color information with respect to the color information extracted from an image of an object captured by an imaging unit, and a color region extraction unit configured to extract a color region corresponding to the color information from another captured image that is different from the captured image from which the color information is extracted, based on the effective range of the color information.

17 Claims, 19 Drawing Sheets

(51) Int. Cl.
*G06T 7/73* (2017.01)
*G06T 7/11* (2017.01)
*G06K 9/00* (2006.01)

(56) References Cited

U.S. PATENT DOCUMENTS

| | | | | |
|---|---|---|---|---|
| 2009/0059326 A1* | 3/2009 | Hong | ............... | G06T 11/001 358/518 |
| 2009/0295927 A1* | 12/2009 | Ohtake | ............ | G06K 9/00234 348/207.1 |
| 2010/0262405 A1* | 10/2010 | Richard | .............. | G06T 15/20 703/1 |
| 2011/0026824 A1* | 2/2011 | Ishii | ................. | G06T 11/001 382/167 |
| 2012/0020552 A1* | 1/2012 | Itoh | ..................... | H04N 1/58 382/163 |
| 2012/0293695 A1* | 11/2012 | Tanaka | ............ | G02F 1/133514 348/280 |
| 2013/0058569 A1* | 3/2013 | Kawano | ............ | H04N 1/40075 382/165 |
| 2013/0222424 A1* | 8/2013 | Morinaga | ............ | G06T 19/006 345/629 |
| 2013/0266213 A1* | 10/2013 | Yamashita | ......... | H04N 13/0022 382/154 |
| 2014/0314302 A1* | 10/2014 | Minato | ............... | G06T 7/0004 382/141 |
| 2015/0091715 A1* | 4/2015 | Nomura | ............... | G08G 1/166 340/435 |
| 2015/0363920 A1* | 12/2015 | Chang | ................. | G06T 5/005 348/241 |
| 2016/0005348 A1* | 1/2016 | Yanagi | ................. | G09G 3/20 345/600 |
| 2016/0163066 A1* | 6/2016 | Ishihara | ............ | G06K 9/00234 382/162 |
| 2016/0253799 A1* | 9/2016 | Rahman | .................. | G06T 7/60 382/128 |

* cited by examiner

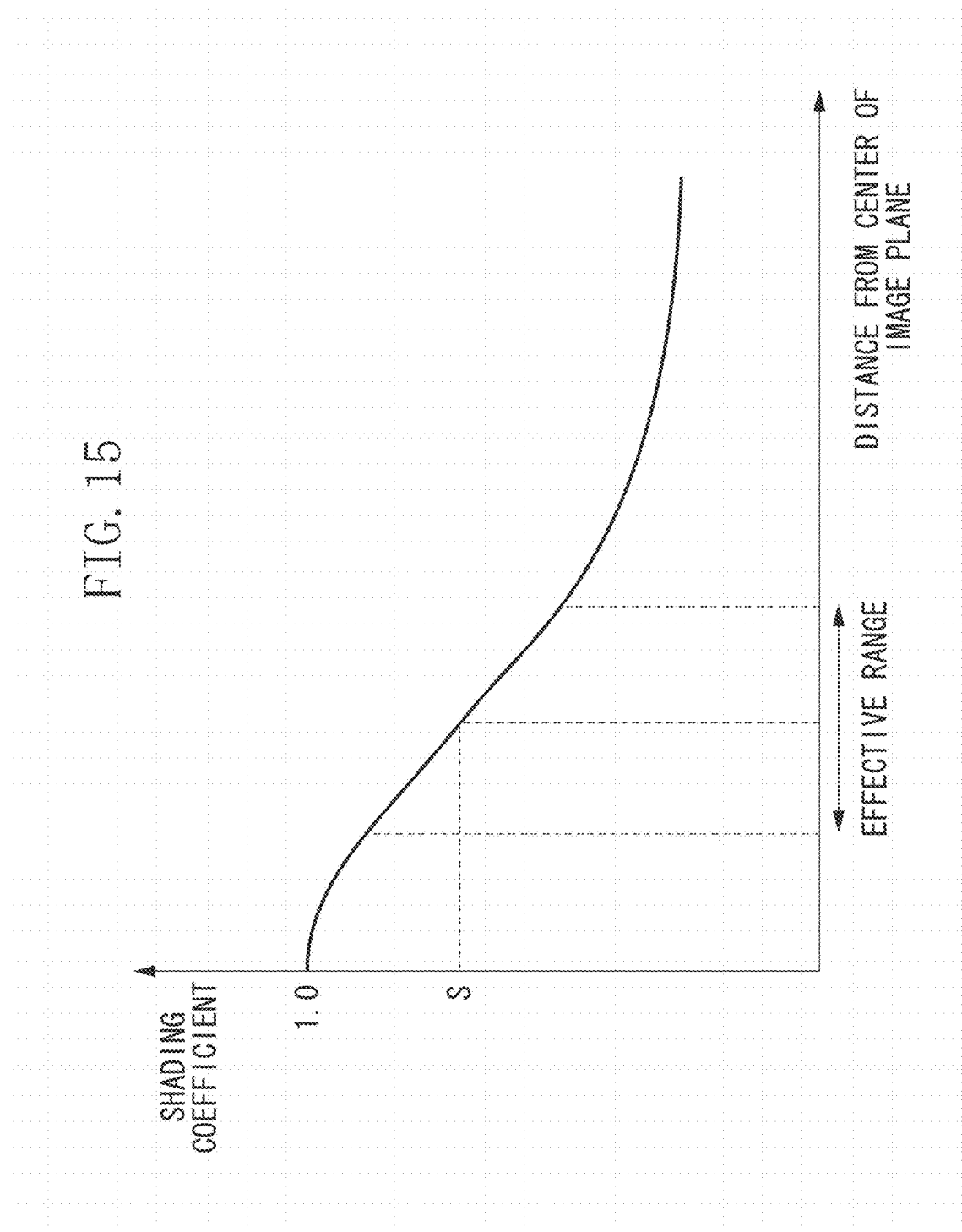

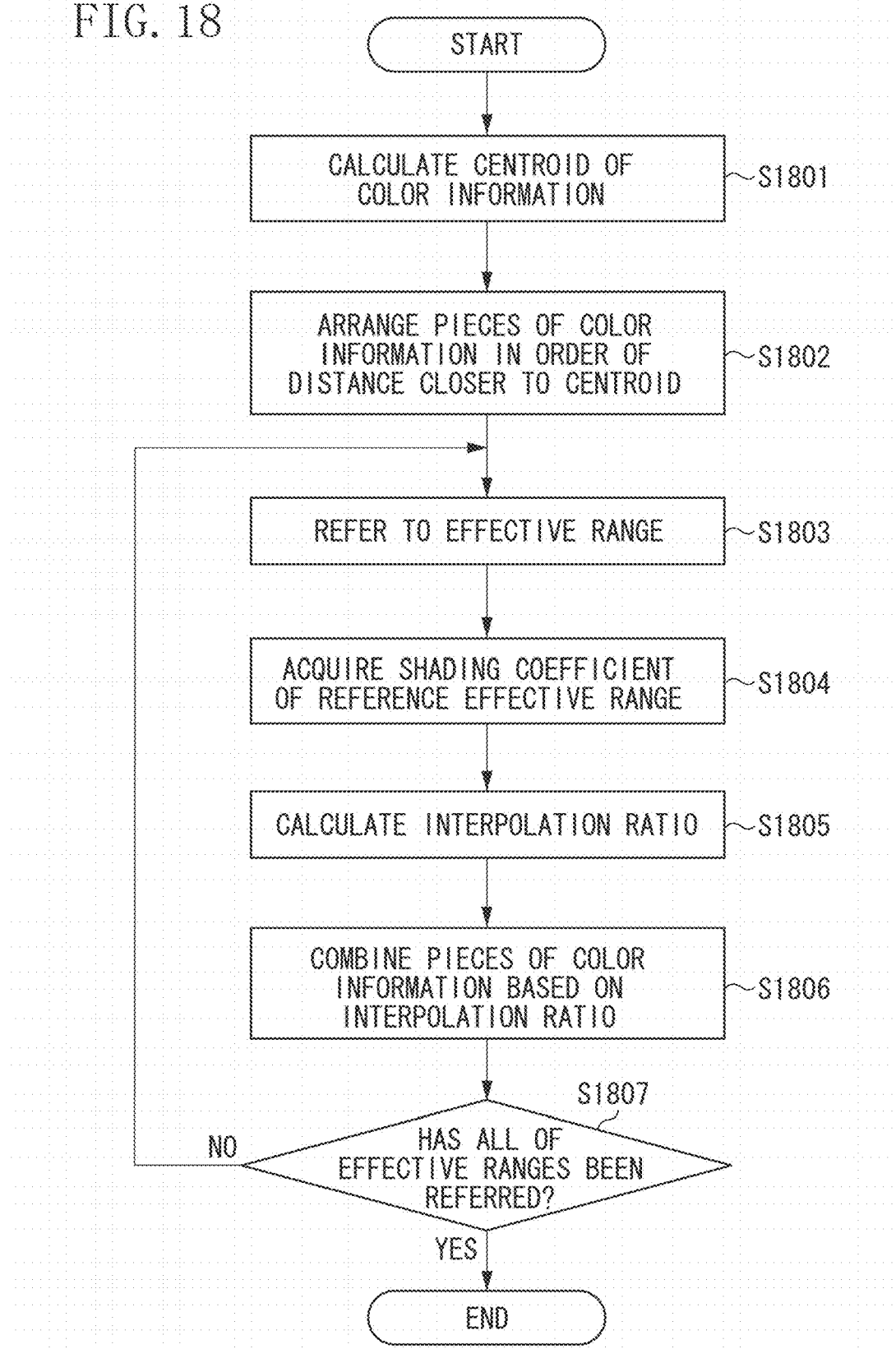

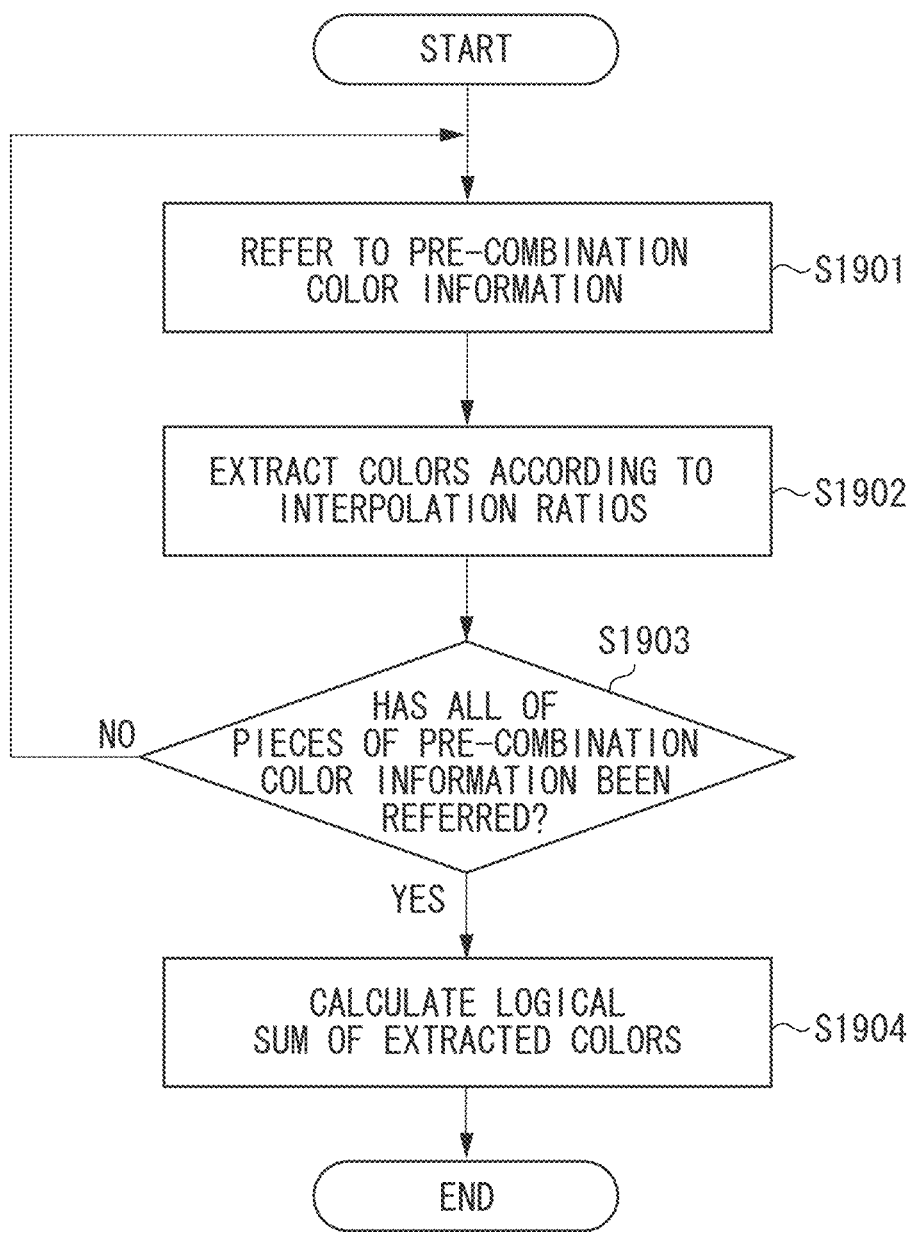

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

There is a technique relating to mixed reality in which information of a virtual space is superimposed onto a real space and provided to a user. In the mixed reality, a combined image is displayed by superimposing an image (i.e., computer graphics (CG)) of a virtual space onto all or a part of a real video image captured by an imaging apparatus such as a video camera according to a position or an orientation of the imaging apparatus.

By extracting a region such as a user's hand from a video image of a real space, it is possible to determine whether interference occurs between the region of the real space and a CG, or to determine the anteroposterior relationship between the relevant region of the real space and a CG. In the description below, a region of an object such as a user's hand in a captured image is referred to as an object region as necessary.

The object region is extracted through various methods such as a method which executes region division, a method which dynamically extracts a contour, and a method which uses a learning result. In any of the above methods, an initial object region is detected by extracting a color of the object region (e.g., a flesh color). The above technique for extracting the color of the object region is described in Japanese Patent Application Laid-Open No. 2007-257087, Japanese Patent Application Laid-Open No. 2005-228140, or Japanese Patent No. 3118915.

The following technique is discussed in Japanese Patent Application Laid-Open No. 2007-257087. A flesh color distribution model is created from flesh color data of a wide variety of people. Thereafter, presence of a human face is identified from an input image, and a flesh color distribution model is created from data of flesh color pixels in a region of the identified face. A modified flesh color distribution model is created by weighing and adding up these flesh color distribution models. Flesh color likelihood corresponding to each of the pixels in the input image data is acquired by using the modified flesh color distribution model. Then, as to whether the color of each pixel data group of the input image data is a flesh color is determined by comparing the flesh color likelihood and a threshold value.

Further, the following technique is discussed in Japanese Patent Application Laid-Open No. 2005-228140. Pieces of color information are each extracted from a background image without an object and a background image with an object. These pieces of color information are compared with each other, and color information that is not included in the background image without an object is registered as color information of the object from among the color information of the background image with an object. Further, detection precision of a color of the object region is improved by adjusting color information of a noise region that is specified by a user from the object region.

Further, according to the technique discussed in Japanese Patent No. 3118915, a color table is created according to a pixel position while a color table to be used is specified at each pixel. Then, a color of each pixel is extracted by using a specified color table.

However, when the techniques described in Japanese Patent Application Laid-Open No. 2007-257087 or Japanese Patent Application Laid-Open No. 2005-228140 is employed, there is a risk that the color of the object region cannot be extracted correctly when a tint varies depending on pixel positions. For example, in an image captured by a camera showing limb darkening, luminance or tint is different in a central portion and an edge portion. Therefore, if the color information is registered only in a vicinity of the central portion of the captured image, the color is more likely to be undetected at the edge portion of the image plane. On the other hand, if the color information is registered at the entire region of the image plane, over-detection of the color increases.

On the other hand, with the technique described in Japanese Patent No. 3118915, a registered color can be extracted regardless of a region in the captured image because a color table is created at each of the pixels in the image. However, it is hard to realize the above-described technique because a huge memory will be necessary to create the color table for each of the pixels.

SUMMARY

According to an exemplary embodiment, an information processing apparatus includes an effective range acquisition unit configured to acquire an effective range of color information with respect to the color information extracted from an image of an object captured by an imaging unit, and a color region extraction unit configured to extract a color region corresponding to the color information from another captured image that is different from the captured image from which the color information is extracted, based on the effective range of the color information.

According to an exemplary embodiment, a color of the object region in the captured image can be easily and reliably extracted.

Further features will become apparent from the following description of exemplary embodiments with reference to the attached drawings.

BRIEF DESCRIPTION OF THE DRAWINGS

FIG. 15 is a graph illustrating a relationship between a distance from a center of an image plane and a shading coefficient.

FIG. 18 is a flowchart illustrating interpolation processing executed by the color information interpolation unit.

FIG. 19 is a flowchart illustrating combining processing executed by the color information interpolation unit.

DESCRIPTION OF THE EMBODIMENTS

Hereinafter, an exemplary embodiment will be described in detail with reference to the appended drawings.

First, a first exemplary embodiment will be described.
<Configuration>

Figure 1:
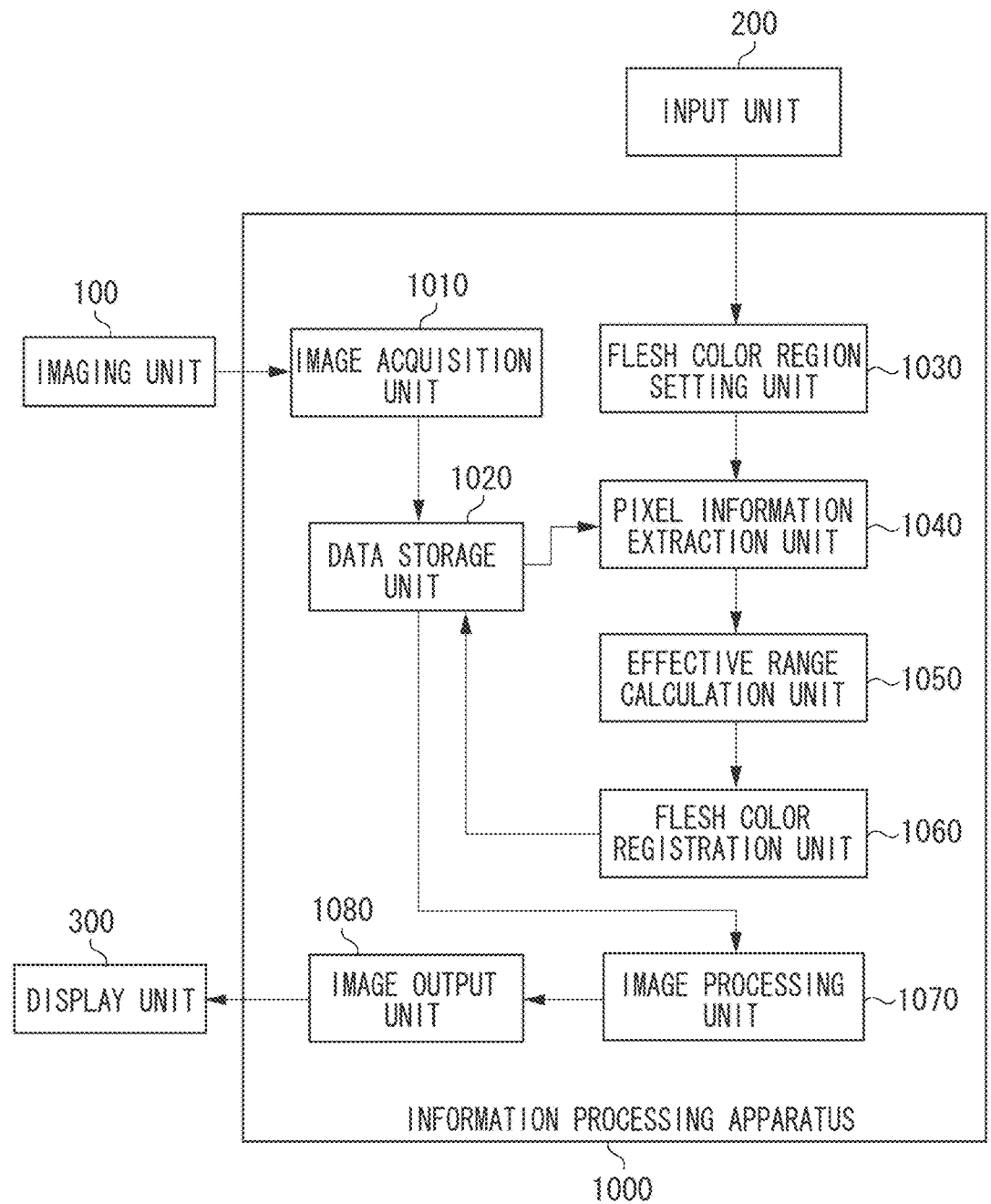
FIG. 1 is a block diagram illustrating a first example of a configuration of an image processing system.
Figure 2:
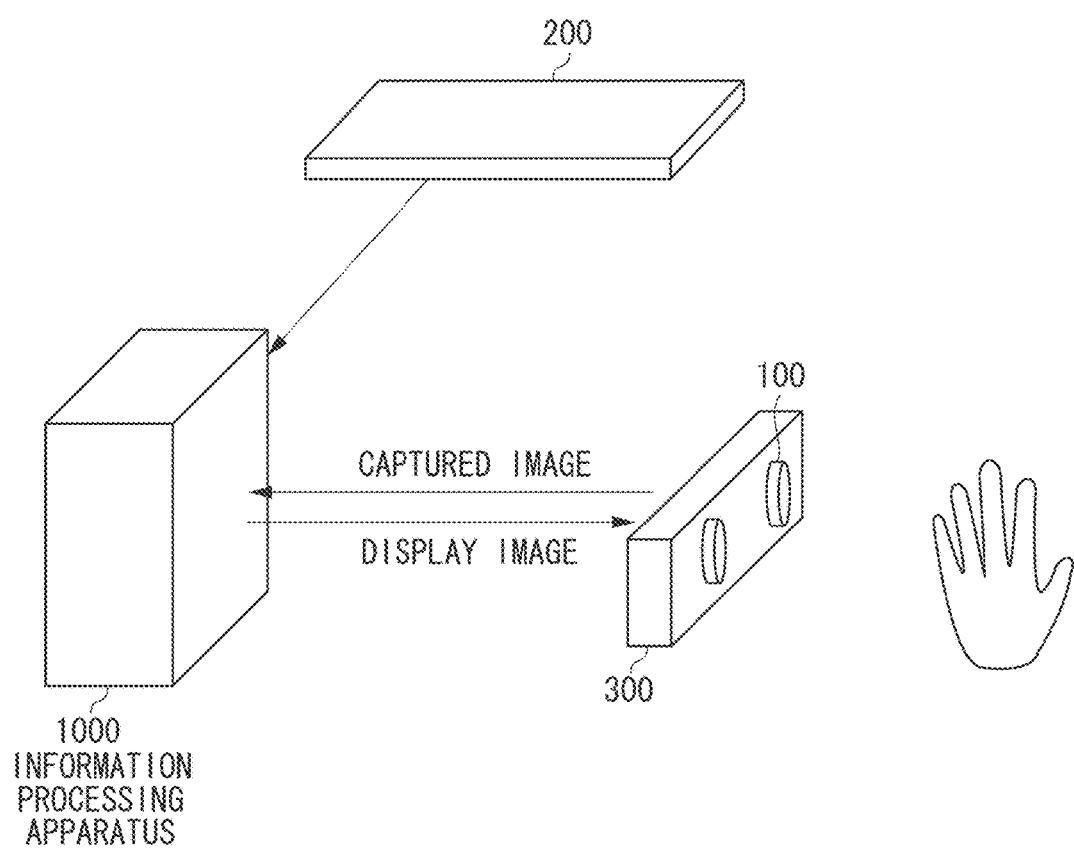
FIG. 2 is a diagram illustrating an external configuration of the image processing system.

FIG. 1 is a block diagram illustrating an example of a configuration of an image processing system. FIG. 2 is a schematic diagram illustrating an example of the configuration of the image processing system according to the present exemplary embodiment.

As illustrated in FIGS. 1 and 2, the image processing system is configured of an imaging unit 100, an input unit 200, a display unit 300, and an information processing apparatus 1000. In the present exemplary embodiment, the imaging unit 100, the input unit 200, and the display unit 300 are communicably connected to the information processing apparatus 1000. The information processing apparatus 1000 acquires a captured image from the imaging unit 100. For example, the imaging unit 100 is realized by a video see-through head mounted display (HMD) or a network camera. The input unit 200 is realized by a mouse or a keyboard. The display unit 300 is realized by a display such as an HMD or a monitor of a personal computer (PC).

As illustrated in FIG. 1, the information processing apparatus 1000 includes an image acquisition unit 1010, a data storage unit 1020, a flesh color region setting unit 1030, a pixel information extraction unit 1040, an effective range calculation unit 1050, a flesh color registration unit 1060, an image processing unit 1070, and an image output unit 1080.

The image acquisition unit 1010 acquires an image captured by the imaging unit 100 and stores the acquired image in the data storage unit 1020. The captured image includes an object such as a hand.

The data storage unit 1020 stores information including data of a virtual object, a captured image received from the image acquisition unit 1010, and data of a color table received from the flesh color registration unit 1060.

The flesh color region setting unit 1030 sets a region input through the input unit 200 as a region in which a flesh color exists.

The pixel information extraction unit 1040 extracts color information of a pixel and a pixel position from a captured image acquired by the image acquisition unit 1010. Herein, the color information is information about a color including no luminance, such as "CbCr" or "a*b*". The color information is not limited to the above, and any expression method which does not depend on luminance may be employed. Further, the pixel position is information indicating a position of a pixel which is, for example, expressed by a distance from a center of an image plane. Alternatively, by dividing a region of the image plane into a plurality of small regions, the pixel position may be expressed by an identification number of each of the small regions. The pixel position may be expressed by any method as long as a region of the pixel can be identified. In the present exemplary embodiment, description will be given in which a pixel position is expressed by a distance from the center of the image plane.

Based on a distribution of the number of pixels at each color information (relationship between the number of pixels and the pixel positions), the effective range calculation unit 1050 calculates an image region (effective range) in which the color information is effective as a flesh color. For example, the effective range calculation unit 1050 derives appearance frequency of the color information at each distance from the center of the image plane, and specifies a distance range with high appearance frequency as an image region (effective range) in which the color information is effective at each color information. Thus, the effective range can be acquired at each color information. In below description, a table in which an effective range of each color information is registered is referred to as "color table" as necessary.

The flesh color registration unit 1060 stores data (effective range of each color information) calculated by the effective range calculation unit 1050 in the data storage unit 1020 (color table).

The image processing unit 1070 extracts a flesh color region from a captured image by using the color table registered by the flesh color registration unit 1060. The image processing unit 1070 combines information indicating a result of the extraction with the captured image to generate a combined image.

The image output unit 1080 displays the combined image generated by the image processing unit 1070 on the display unit 300.

<Processing Steps>

Figure 3:
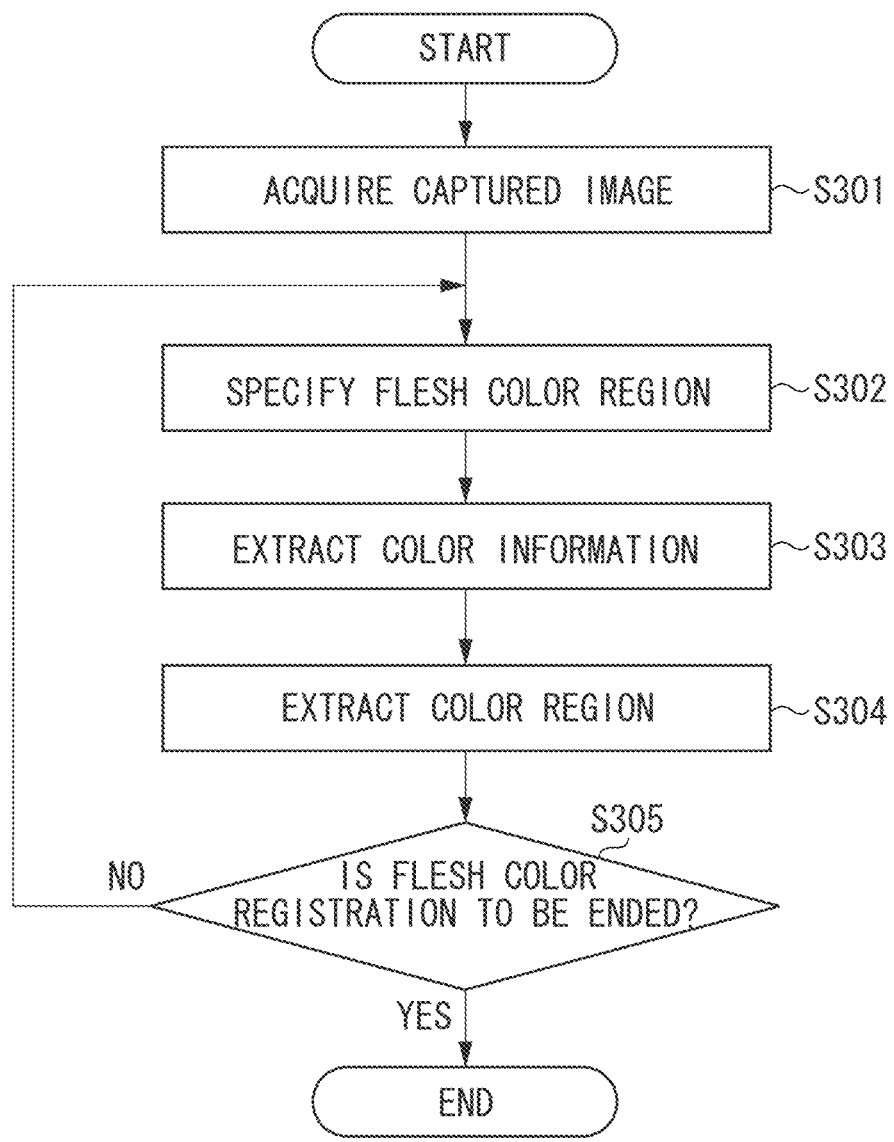
FIG. 3 is a flowchart illustrating a first example of flesh color registration processing.

FIG. 3 is a flowchart illustrating an example of a flow of flesh color registration processing executed by the information processing apparatus 1000.

In step S301, the image acquisition unit 1010 acquires an image captured by the imaging unit 100. For example, the image acquisition unit 1010 is realized by using a video capture card for acquiring an image acquired by the imaging unit 100.

Next, in step S302, the flesh color region setting unit 1030 specifies a flesh color region in the captured image acquired by the image acquisition unit 1010. A region set by a user through operation of the input unit 200 (e.g., graphical user interface (GUI)) can be employed as a flesh color region. Alternatively, a pre-defined region may be employed as a flesh color region. For example, the information processing apparatus 1000 may either display a frame in a screen (electronic view finder) of the imaging unit 100, or display a captured image and a frame on the display unit 300, so as to prompt a user to capture an object in a composition in which the flesh color is captured within the frame. In this case, a region within the frame is employed as the flesh color region.

Next, in step S303, the pixel information extraction unit 1040 executes color information extraction processing. In the present exemplary embodiment, the pixel information extraction unit 1040 extracts pieces of color information and pixel positions of all of pixels from the captured image acquired by the image acquisition unit 1010. Then, the effective range calculation unit 1050 executes effective range setting processing. In the present exemplary embodiment, the effective range calculation unit 1050 calculates an image region (effective range) in which the color information is effective as a flesh color, for each color information based on a distribution of the number of pixels for each of the color information. Further, the flesh color registration unit 1060 creates and stores a color table in the data storage unit 1020. As described above, the color information and the effective range acquired by the effective range calculation unit 1050 are registered in the color table in association with each other. The processing executed in step S303 will be described below in detail.

Next, in step S304, the image processing unit 1070 executes color region extraction processing. In the present exemplary embodiment, the image processing unit 1070 extracts a flesh color region from a captured image by using a color table stored in the data storage unit 1020. For example, the image processing unit 1070 extracts color information and a position of each pixel of the captured image, reads from the color table an effective range corresponding to color information same as the extracted color information, and determines a color at the pixel position as a flesh color if the extracted pixel position exists in the effective range. The image processing unit 1070 combines information indicating a result of the above extraction with the captured image to generate a combined image. The image output unit 1080 displays the combined image on the display unit 300. In addition, an extraction result of the flesh color region can be indicated by emphasizing the extracted region within the captured image. For example, a red color may be superimposed on a pixel to be emphasized, through alpha-blending processing, or a pixel to be emphasized may be filled with a black color. Any method can be used to display an extraction result of a flesh color region as long as the extraction result of a flesh color region can be displayed.

Next, in step S305, the user checks the combined image and provides an instruction for ending or continuing the flesh color registration by operating the input unit 200. Based on the instruction, the information processing apparatus 1000 determines whether to end the flesh color registration. As a result of the determination, if the flesh color registration is to be ended (YES in step S305), the processing illustrated in the flowchart of FIG. 3 is ended.

On the other hand, if the flesh color registration is to be continued (NO in step S305), the processing returns to step S302, and the flesh color region setting unit 1030 specifies a region that is different from the region already specified as a flesh color region. Then, the processing in steps S302 to S305 is executed repeatedly until it is determined that the flesh color registration is ended.

However, in step S305, if it is determined that the flesh color registration is to be continued, the processing may be returned to step S301 instead of step S302. In this case, the imaging unit 100 acquires a captured image in which an object such as a hand is placed at a position different from the position within the image captured in the past.

Figure 4:
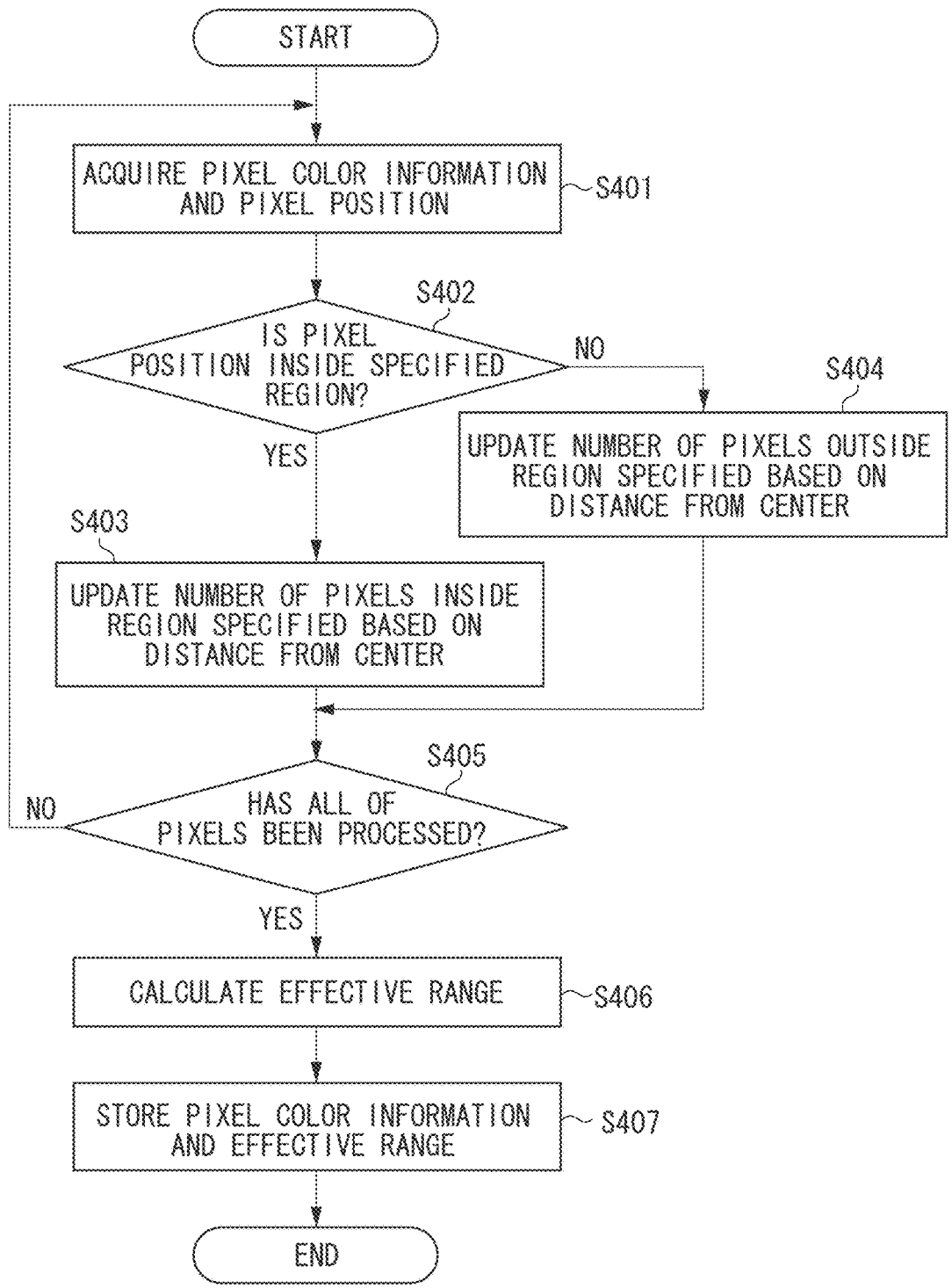
FIG. 4 is a flowchart illustrating details of processing executed in step S303.

Next, an example of processing details of step S303 in FIG. 3 will be described with reference to the flowchart in FIG. 4.

In step S401, the pixel information extraction unit 1040 executes pixel selection processing. In the present exemplary embodiment, the pixel information extraction unit 1040 selects one non-selected pixel from among the pixels of the captured image acquired by the image acquisition unit 1010, and acquires color information and a pixel position of that pixel. As described above, in the present exemplary embodiment, description will be given in which the pixel position is expressed by a distance from the center of the image plane.

Next, in step S402, the effective range calculation unit 1050 executes region determination processing. In the present exemplary embodiment, the effective range calculation unit 1050 determines whether a pixel position of the pixel selected in step S401 is the inside (flesh color region) or the outside (non-flesh color region) of the region specified by the flesh color region setting unit 1030 in step S302 (i.e., specified region).

As a result of the determination, if the pixel position of the pixel selected in step S401 is inside the specified region (i.e., flesh color region) (YES in step S402), the processing proceeds to step S403. In step S403, the effective range calculation unit 1050 executes relationship derivation processing of the flesh color region. In the present exemplary embodiment, the effective range calculation unit 1050 adds "1" to the number of flesh color pixels (color information acquired in step S401) in the pixel position (distance from the center of the image plane) acquired in step S401. Then, the processing proceeds to step S405 described below.

On the other hand, if the pixel position selected in step S401 is outside the specified region (i.e., non-flesh color region) (NO in step S402), the processing proceeds to step S404. In step S404, the effective range calculation unit 1050 executes relationship derivation processing of the non-flesh color region. In the present exemplary embodiment, the effective range calculation unit 1050 adds "1" to the number of non-flesh color pixels (color information acquired in step S401) in the pixel position (distance from the center of the image plane) acquired in step S401. Then, the processing proceeds to step S405.

In step S405, the pixel information extraction unit 1040 determines whether the processing in steps S401 to S404 has been finished with respect to all of the pixels in the captured image acquired by the image acquisition unit 1010. As a result of the determination, if the processing has not been finished with respect to all of the pixels in the captured image acquired by the image acquisition unit 1010 (NO in step S405), the processing returns to step S401. After the processing returns to step S401, the pixel information extraction unit 1040 selects one non-selected pixel from among the pixels in the image acquired by the image acquisition unit 1010. Then, the processing in steps S401 to S405 is executed repeatedly until the processing is finished with respect to all of the pixels of the captured image acquired by the image acquisition unit 1010.

As described above, when the processing is finished with respect to all of the pixels in the captured image acquired by the image acquisition unit 1010, the processing proceeds to step S406. In step S406, the effective range calculation unit 1050 executes effective range calculation processing. In the present exemplary embodiment, based on the numbers of flesh color pixels and non-flesh color pixels in respective pixel positions (distances from the center of the image plane) acquired by the pixel information extraction unit 1040, the effective range calculation unit 1050 calculates an image region (effective range) effective as a flesh color region for each color information. Specifically, the effective range calculation unit 1050 may compare the numbers of the flesh color pixels and the non-flesh color pixels at respective pixel positions, and assign a range in which the number of flesh color pixels according to a distance from the center of the image plane is greater than the number of non-flesh color pixels at that distance.

Figure 5:
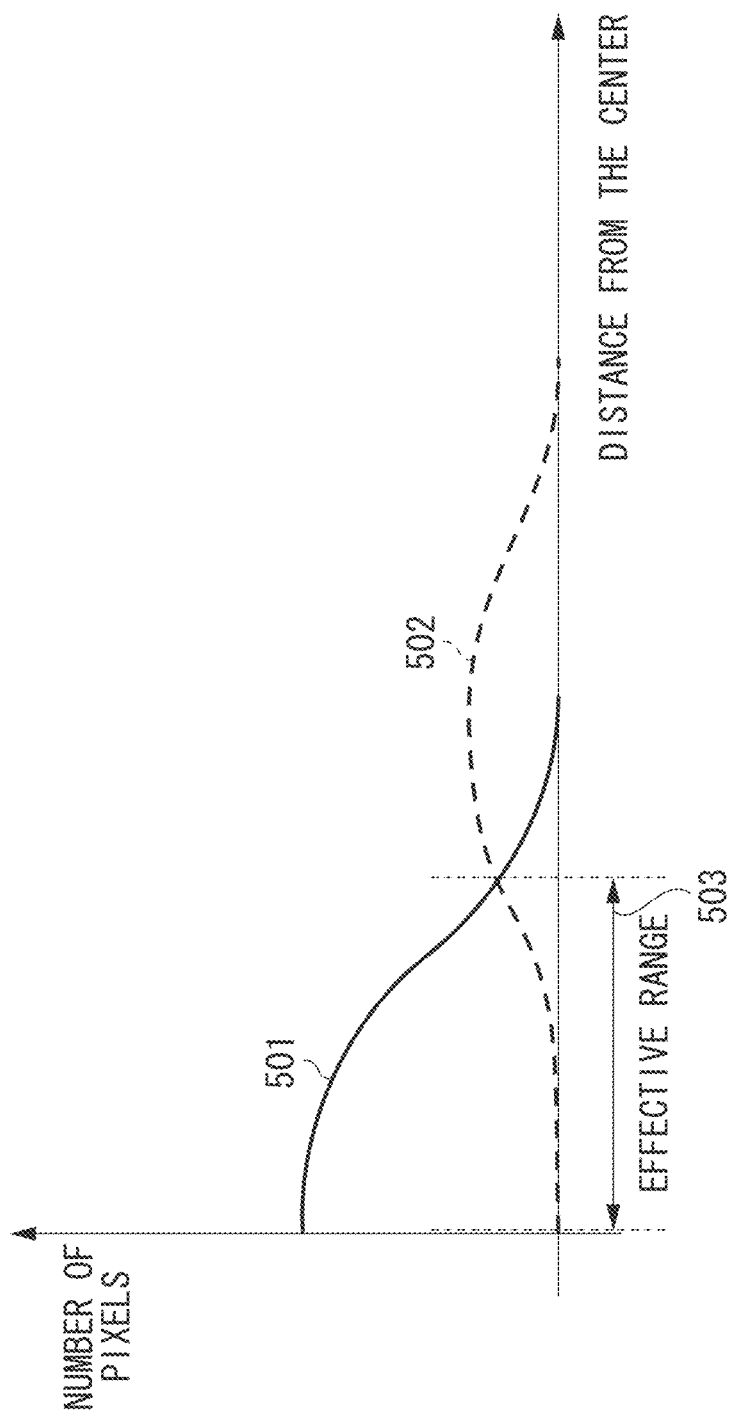
FIG. 5 is a graph illustrating distributions of a number of flesh color pixels and a number of non-flesh color pixels.

FIG. 5 is a graph illustrating an example of a distribution of the number of flesh color pixels and the number of non-flesh color pixels in regions within the captured image.

For example, as illustrated in FIG. 5, in a case where the distribution of the number of pixels (relationship between the number of pixels and pixel positions in the captured image) is represented as a distribution 501 of flesh color pixels and a distribution 502 of non-flesh color pixels, the effective range calculation unit 1050 calculates an image region (effective range 503) that is effective as a flesh color region. In addition, the distributions 501 and 502 are acquired for each color information, so that the effective range 503 is also acquired for each color information.

However, the effective range does not have to be calculated as described above. For example, a range of a pixel position (distance from the center of the image plane) having a certain number or more of the flesh color pixels may be calculated as the effective range. In this case, only the distribution 501 of the number of flesh color pixels may be acquired. Alternatively, from among the ranges in which the number of flesh color pixels is greater than the number of non-flesh color pixels, a range having a certain number or more of the flesh color pixels may be calculated as the effective range. Furthermore, a range of a pixel position (distance from the center of the image plane) having a certain number or less of the non-flesh color pixels may be calculated as the effective range. In this case, only the distribution 502 of non-flesh color pixels may be acquired. Further, alternatively, from among the ranges in which the number of flesh color pixels is greater than the number of non-flesh color pixels, a range of a certain number or less having the non-flesh color pixels may be calculated as the effective range.

The effective range calculation unit 1050 calculates the above-described effective range for each color information.

Figure 6:
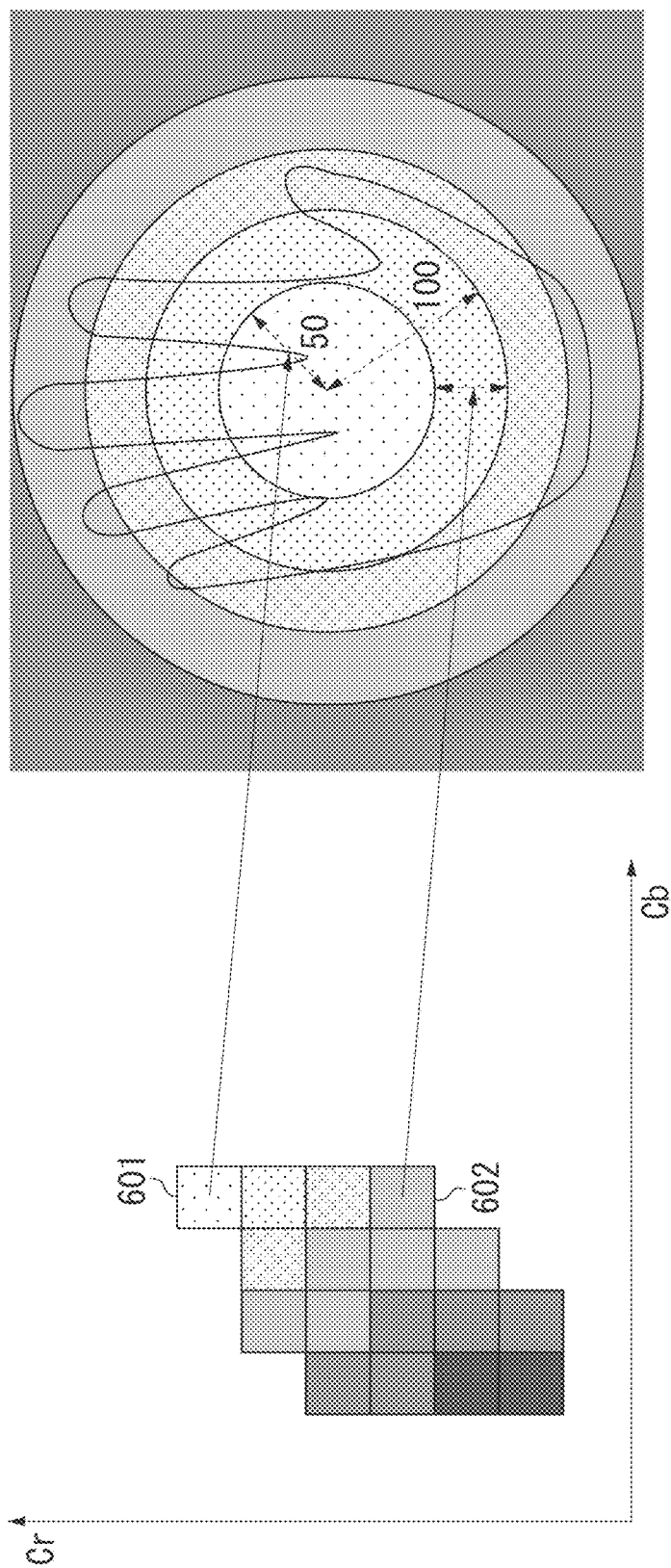
FIG. 6 is a diagram illustrating a color table.

Next, in step S407, the flesh color registration unit 1060 executes registration processing. In the present exemplary embodiment, the flesh color registration unit 1060 stores the effective ranges for each color information which are calculated by the effective range calculation unit 1050 in the data storage unit 1020. FIG. 6 is a diagram illustrating an example of the color table created through the above processing. Distance information that indicates a region within the captured image calculated as an effective range is associated with each color information stored in the color table. For example, identification information for identifying an effective range of color information is associated with each color information stored in the color table. The identification information may be numerical data of the distance or an identification number of the effective range. In the example illustrated in FIG. 6, identification information of an effective range of color information is numerical data of a distance. In FIG. 6, an effective range of color information 601 is a range of 50 pixels from the center of the image plane. Further, an effective range of color information 602 is between 50 pixels from the center of the image plane and 100 pixels from the center of the image plane. Thus, the effective ranges are registered in the color table with respect to all color information (cells in FIG. 6) of the captured image.

In a case where the information processing apparatus 1000 detects an object region such as a region of a hand from the captured image in order to superimpose a CG onto the captured image, the information processing apparatus 1000 acquires color information and a pixel position with respect to each pixel in the captured image, and reads an effective range corresponding to that color information from the color table. If the pixel position of the pixel is included in the read effective range, the information processing apparatus 1000 determines that a color of the pixel in that pixel position is a flesh color. On the other hand, if the pixel position of the pixel is not included in the read effective range, the information processing apparatus 1000 determines that a color of the pixel in that pixel position is a non-flesh color. The information processing apparatus 1000 extracts a region of the pixel the color of which is determined to be a flesh color as the object region (e.g., a region of a hand) in the captured image.

As described above, in the present exemplary embodiment, the information processing apparatus 1000 derives color information and a pixel position of each pixel in the captured image, and determines whether each pixel exists in a flesh color region (i.e., whether the pixel is a flesh color pixel). The information processing apparatus 1000 acquires the distributions 501 and 502 of the numbers of flesh color pixels and non-flesh color pixels for each color information, and calculates the effective range 503 of each color information based on the distributions 501 and 502. Accordingly, even if limb darkening occurs in the captured image, an object region such as a region of a hand can be precisely extracted from a real video image without having a large number of color tables. Therefore, a real object region such as a region of a hand can be combined with a virtual space without a sense of discomfort, in the mixed reality.

Next, a second exemplary embodiment will be described. In the first exemplary embodiment, description has been given in which a user determines whether to end the flesh color registration. On the other hand, in the present exemplary embodiment, description will be given in which an information processing apparatus automatically determines whether the flesh color is sufficiently registered, by paying attention to a size of the effective range of each color information. As described above, the present exemplary embodiment is mainly different from the first exemplary embodiment with respect to a method for determining whether to end the flesh color registration. Accordingly, in the present exemplary embodiment described below, same reference numerals as FIGS. 1 to 6 refer to the same items as that of the first exemplary embodiment, and detailed descriptions thereof will be omitted.

<Configuration>

Figure 7:
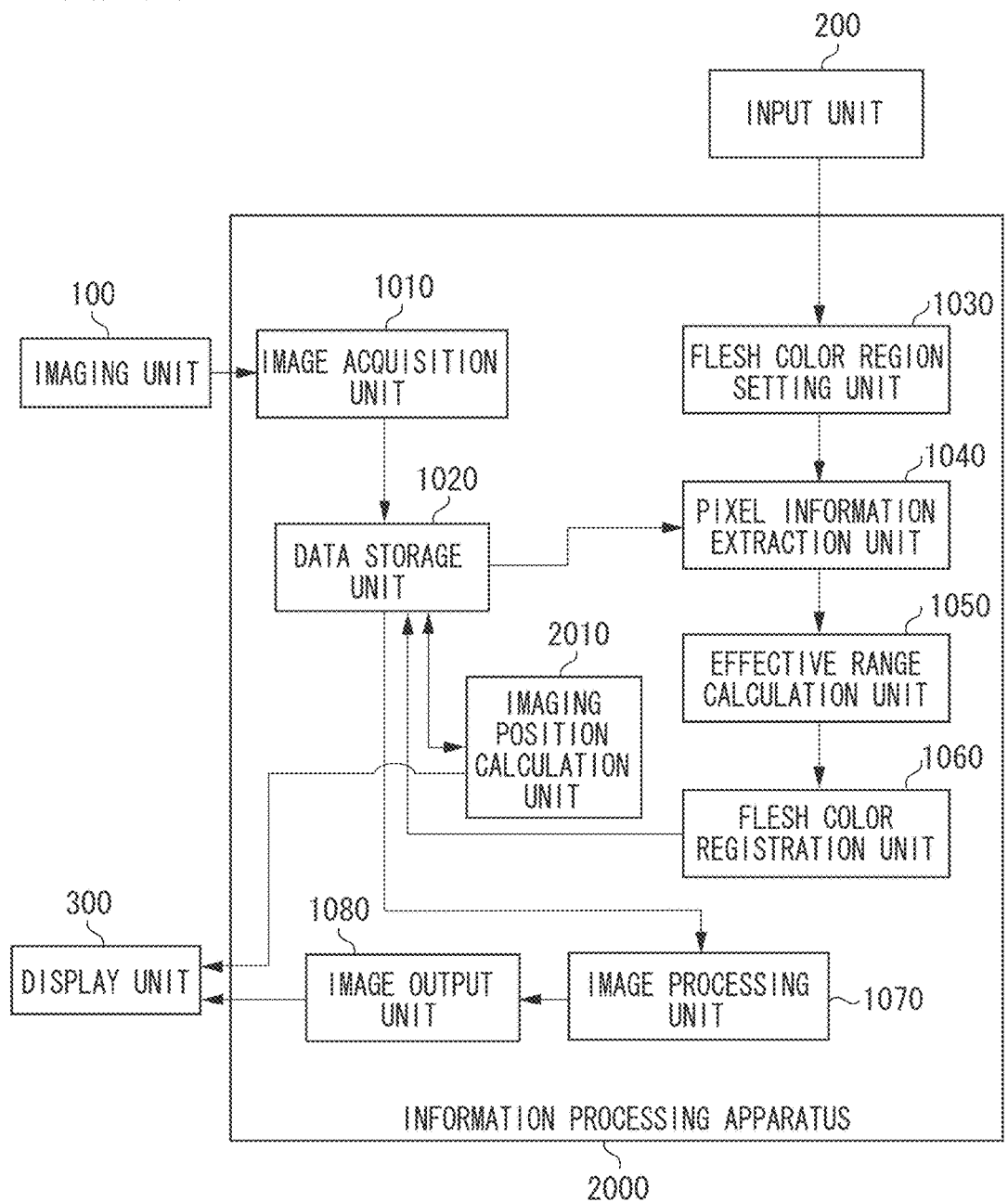
FIG. 7 is a block diagram illustrating a second example of a configuration of the image processing system.

FIG. 7 is a block diagram illustrating an example of a configuration of an image processing system according to the present exemplary embodiment.

As illustrated in FIG. 7, the image processing system according to the present exemplary embodiment is different from the image processing system in FIG. 1 described in the first exemplary embodiment in that an information processing apparatus 2000 additionally includes an imaging position calculation unit 2010.

The imaging position calculation unit 2010 acquires an effective range for each color information from the data storage unit 1020 (color table), and stores information indicating a position of the object in an image plane of subsequent imaging operation in the data storage unit 1020.

<Processing Steps>

Figure 8:
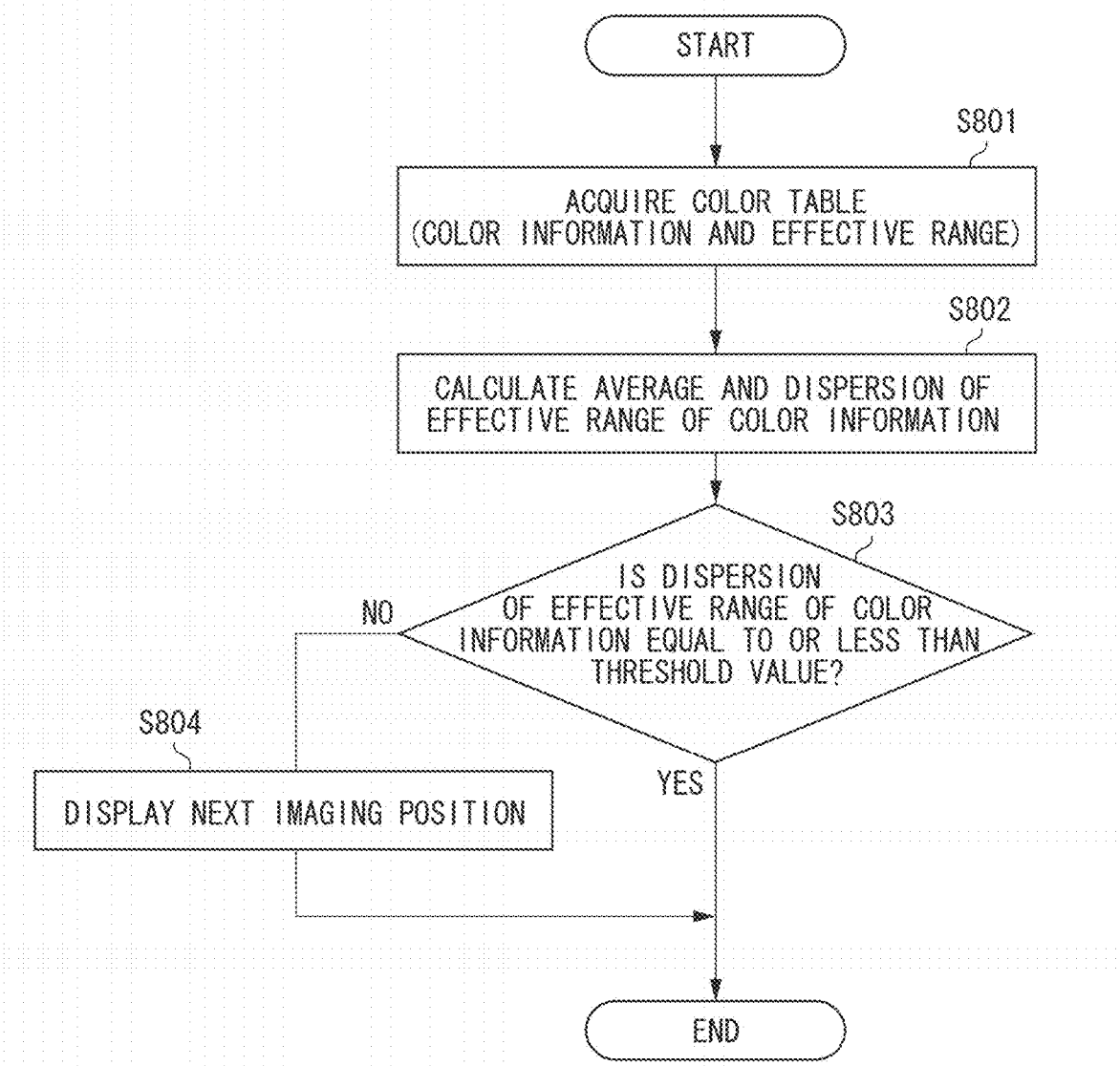
FIG. 8 is a flowchart illustrating processing executed by an imaging position calculation unit.

FIG. 8 is a flowchart illustrating an example of a processing flow executed by the imaging position calculation unit 2010. The processing illustrated in the flowchart of FIG. 8 is executed instead of the processing in step S304 in FIG. 3.

In step S801, the imaging position calculation unit 2010 acquires data (i.e., color information and an effective range) in the color table registered by the flesh color registration unit 1060 from the data storage unit 1020. Next, in step S802, the imaging position calculation unit 2010 calculates an average and a dispersion of the effective range of the color information from the data in the color table acquired in step S801.

Next, in step S803, the imaging position calculation unit 2010 determines whether the dispersion calculated in step S802 is equal to or less than a threshold value. As a result of the determination, if the dispersion is equal to or less than the threshold value (YES in step S803), the imaging position calculation unit 2010 determines that the flesh color is registered sufficiently and ends the flesh color registration.

Figure 9:
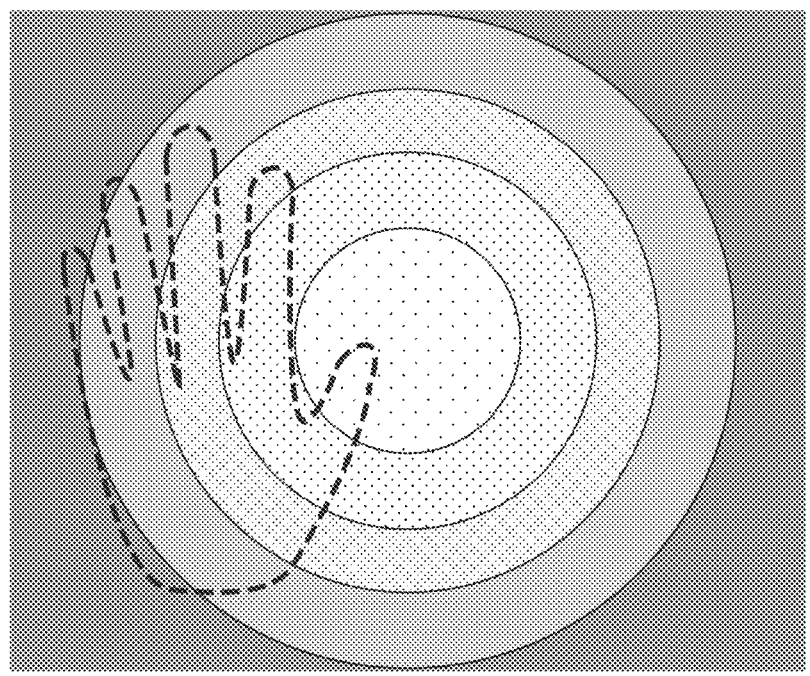
FIG. 9 is a diagram illustrating a display example of information indicating a new imaging region.

On the other hand, if the dispersion is greater than the threshold value (NO in step S803), the processing proceeds to step S804. In step S804, the imaging position calculation unit 2010 executes position derivation processing and output processing. In the present exemplary embodiment, the imaging position calculation unit 2010 calculates an imaging region in which a dispersion becomes smaller, from the average and the dispersion of the effective range of the color information, and displays information indicating that imaging region on the display unit 300. FIG. 9 is a diagram illustrating a display example of the information indicating a new imaging region. For example, if color registration of the flesh color is executed only in a vicinity of the center of the image plane (captured image), variations arise in the effective ranges of respective pieces of color information. Therefore, as illustrated in FIG. 9, the imaging position calculation unit 2010 displays an imaging region to prompt a user to execute imaging operation at a position in which the effective range is shifted from the average thereof (i.e., a position indicated by a dashed line in FIG. 9).

Then, the processing returns to step S301 in FIG. 3, in which the user instructs the imaging unit 100 to capture an image in a state where the object region such as a region of a hand is positioned in the imaging region as displayed in step S804. According to this instruction, the imaging unit 100 captures the object region (a region of a hand) in a composition in which the object such as a hand is captured in the imaging region displayed in step S804 to acquire a captured image.

Through the above processing, the flesh color registration can be executed more appropriately while the user does not have to determine whether to end the flesh color registration.

Next, a third exemplary embodiment will be described. In the first and the second exemplary embodiments, description has been given in which the flesh color registration is executed based on color information and an effective range. In the present exemplary embodiment, a flesh color is registered by using a depth from a camera which is effective in a real space, in addition to the color information and the effective range. As described above, a configuration or processing described in the present exemplary embodiment is mainly different from the first and the second exemplary embodiments in that a depth from the camera effective in a real space is included as the data to be stored in the color table in addition to the color information and the effective range. Accordingly, in the present exemplary embodiment described below, the same reference numerals as the first and the second exemplary embodiments are assigned to the same configuration in FIGS. 1 to 9, and detailed descriptions thereof will be omitted.

<Configuration>

Figure 10:
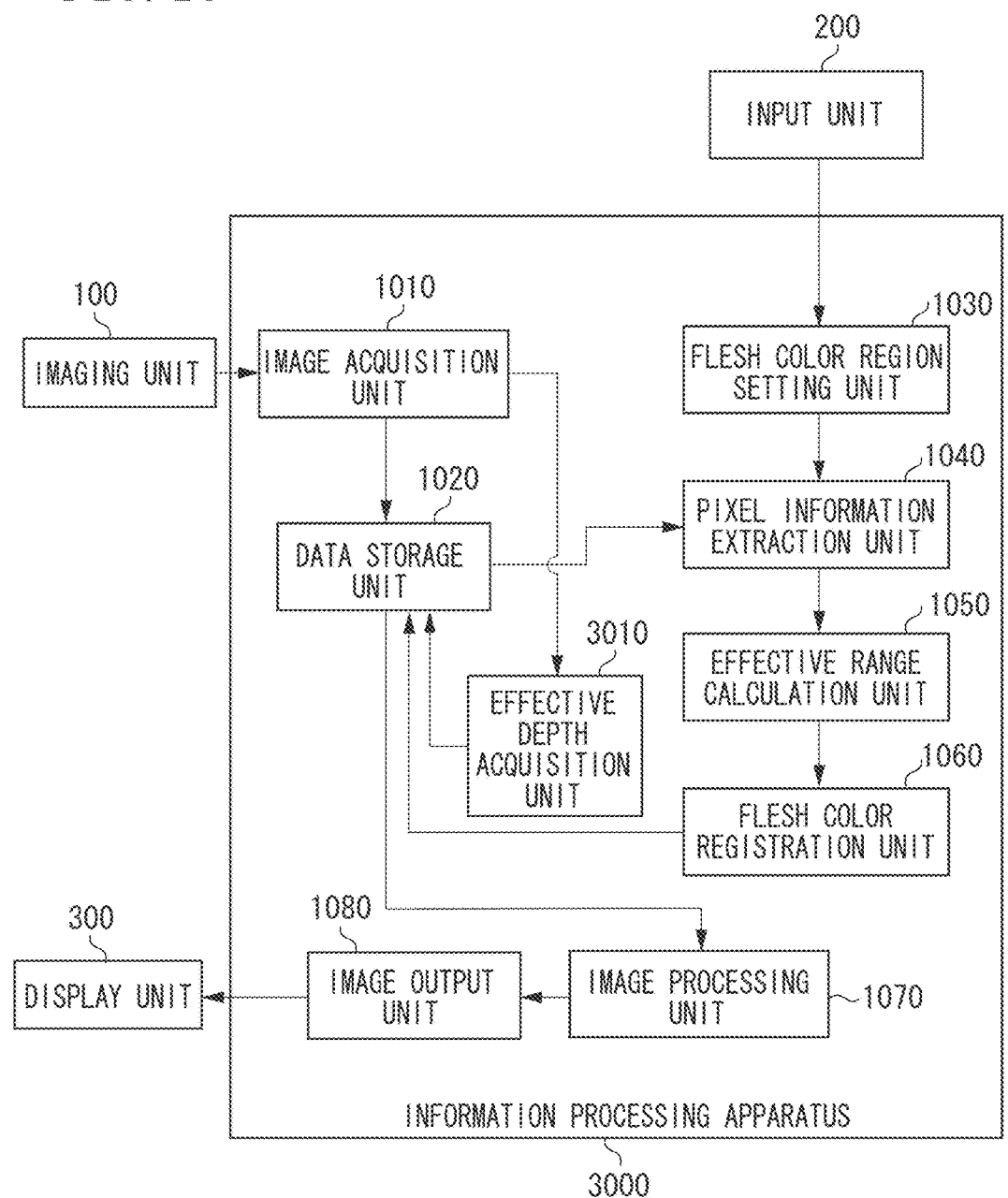
FIG. 10 is a block diagram illustrating a third example of a configuration of the image processing system.

FIG. 10 is a block diagram illustrating an example of a configuration of an image processing system according to the present exemplary embodiment. As illustrated in FIG. 10, the image processing system according to the present exemplary embodiment is different from the image processing system in FIG. 1 described in the first exemplary embodiment in that an information processing apparatus 3000 additionally includes an effective depth acquisition unit 3010.

The effective depth acquisition unit 3010 acquires a flesh color region of the captured image from the data (an effective range of each color information) in the color table stored in the data storage unit 1020, and calculates a depth from the camera (imaging unit 100) with respect to the acquired flesh color region. The depth represents a distance between the camera and the object in a direction vertical to an imaging plane of the camera. The effective depth acquisition unit 3010 calculates depths from the camera with respect to flesh color regions in a plurality of captured images, and stores a range from a maximum depth to a minimum depth in the data storage unit 1020 (color table) as an effective depth range.

<Processing Steps>

Figure 11:
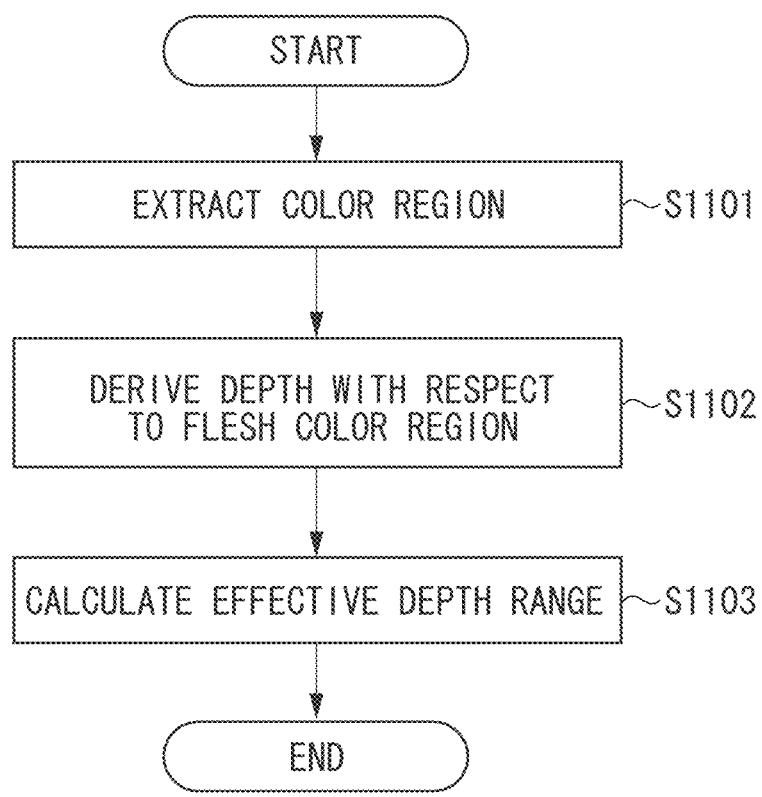
FIG. 11 is a flowchart illustrating processing executed by an effective depth acquisition unit.

FIG. 11 is a flowchart illustrating an example of a processing flow executed by the effective depth acquisition unit 3010. The processing illustrated in the flowchart of FIG. 11 is executed between steps S303 and S304 in FIG. 3.

In step S1101, the effective depth acquisition unit 3010 executes region extraction processing. In the present exemplary embodiment, the effective depth acquisition unit 3010 uses a color table to extract a flesh color region of the captured image acquired by the image acquisition unit 1010.

In step S1102, the effective depth acquisition unit 3010 executes depth derivation processing. In the present exemplary embodiment, the effective depth acquisition unit 3010 derives a depth from the camera (imaging unit 100) with respect to the flesh color region extracted in step S1101. For example, the depth from the camera with respect to the flesh color region may be derived by using a stereo method or a value acquired by a depth sensor. When the stereo method is used, a stereo image is acquired by the imaging unit 100. Any method can be used for deriving a depth from the camera with respect to the flesh color region as long as a distance between the camera (imaging unit 100) and the flesh color region in the real space can be detected. The effective depth acquisition unit 3010 derives each depth with respect to a plurality of captured images.

Lastly, in step S1103, the effective depth acquisition unit 3010 calculates a range from a maximum value to a minimum value of depths from the camera derived from the plurality of captured images with respect to the flesh color regions and stores that calculated range in the data storage unit 1020 as an effective depth range.

In a case where the information processing apparatus 3000 detects an object region such as a region of a hand from the captured image in order to superimpose a CG onto the captured image, the information processing apparatus 3000 acquires color information, a pixel position, and a depth with respect to each of the pixels in the captured image. Then, the information processing apparatus 3000 reads from the color table an effective range (i.e., an image region in which the color information is effective as a flesh color) and an effective depth range corresponding to the acquired color information. If a pixel position is included within the read effective range and a depth at the pixel position is included within the read effective depth range, the information processing apparatus 3000 determines that a color of the pixel in that pixel position is a flesh color. If not, the information processing apparatus 3000 determines that a color of the pixel in that pixel position is a non-flesh color. The information processing apparatus 3000 extracts a region of the above-described pixel determined to be the flesh color pixel as an object region such as a region of a hand in the captured image.

As described above, in the present exemplary embodiment, the information processing apparatus 3000 registers the effective depth range in addition to the effective range corresponding to each color information (i.e., an image region effective as a flesh color), and extracts the object region based on both of the above information. Accordingly, more reliably, only the flesh color included in the object region such as a region of a hand registered at the time of the flesh color registration can be extracted, and thus a false detection rate of the object region can be further reduced.

Next, a fourth exemplary embodiment will be described. In the first to the third exemplary embodiments, description has been given in which an effective range of each color information is calculated based on the set flesh color region. On the other hand, in the present exemplary embodiment, description will be given in which new color information associated with a new effective range is generated by acquiring color information associated in advance with an effective range and executing interpolation processing on that color information. Thus, the present exemplary embodiment is mainly different from the first to the third exemplary embodiments in that color information associated in advance with an effective range is acquired and interpolation processing is executed on that color information. Accordingly, in the present exemplary embodiment described below, the same reference numerals as the first to the third exemplary embodiments are assigned to the same configuration in FIGS. 1 to 11, and detailed descriptions thereof will be omitted.

<Configuration>

Figure 12:
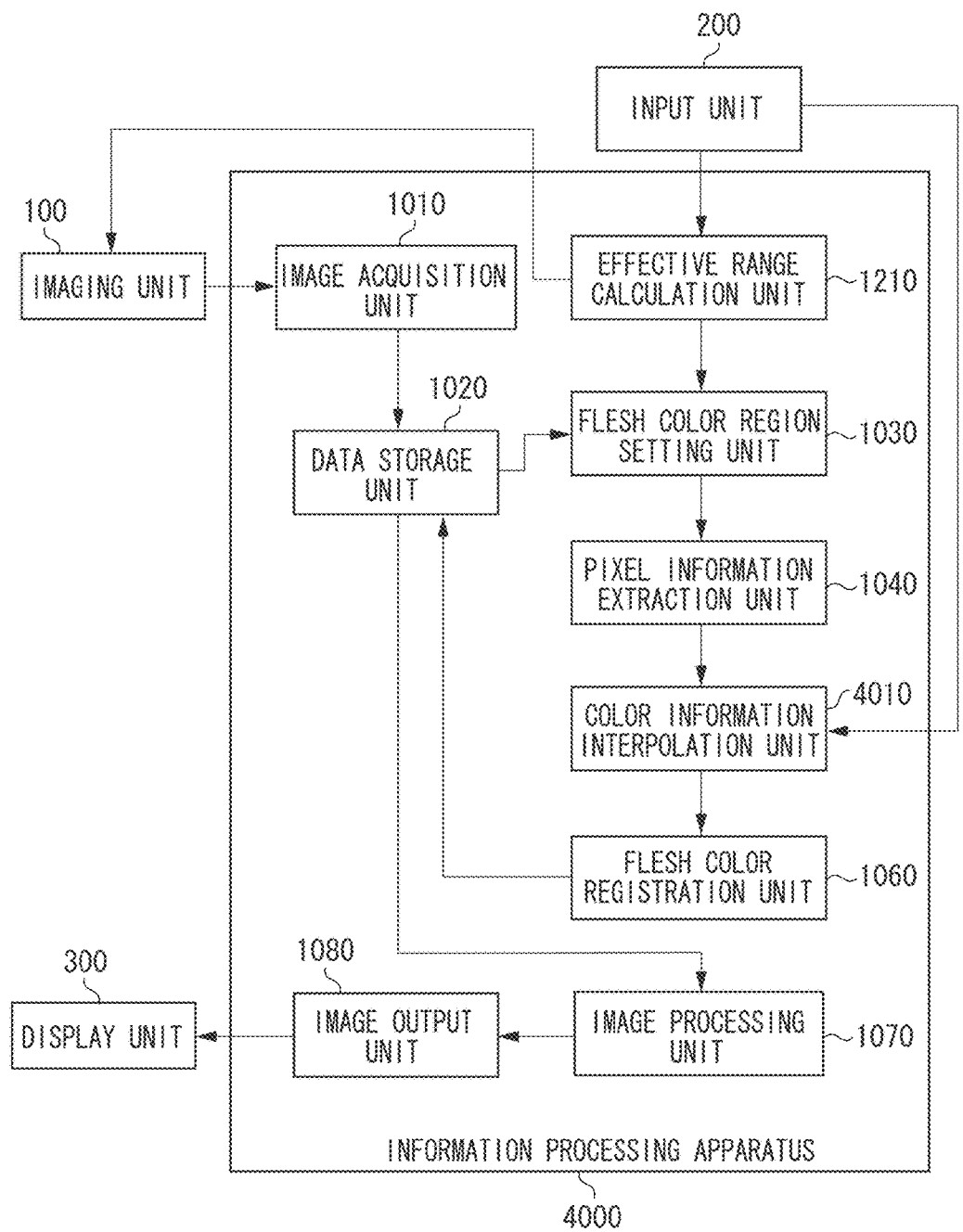
FIG. 12 is a block diagram illustrating a fourth example of a configuration of the image processing system.

FIG. 12 is a block diagram illustrating an example of a configuration of an image processing system according to the present exemplary embodiment. In FIG. 12, a color information interpolation unit 4010 generates new color information associated with a new effective range by executing interpolation processing on color information associated in advance with an effective range. Further, an effective range calculation unit 1210 has a role different from that of the effective range calculation unit 1050 described in the first to the third exemplary embodiments. The effective range calculation unit 1050 according to the first to the third exemplary embodiments calculates an effective range of each color information from color information and a pixel position extracted by the pixel information extraction unit 1040. In contrast, the effective range calculation unit 1210 according to the present exemplary embodiment in advance sets or calculates an effective range of the color information extracted by the pixel information extraction unit 1040.

<Processing Steps>

Figure 13:
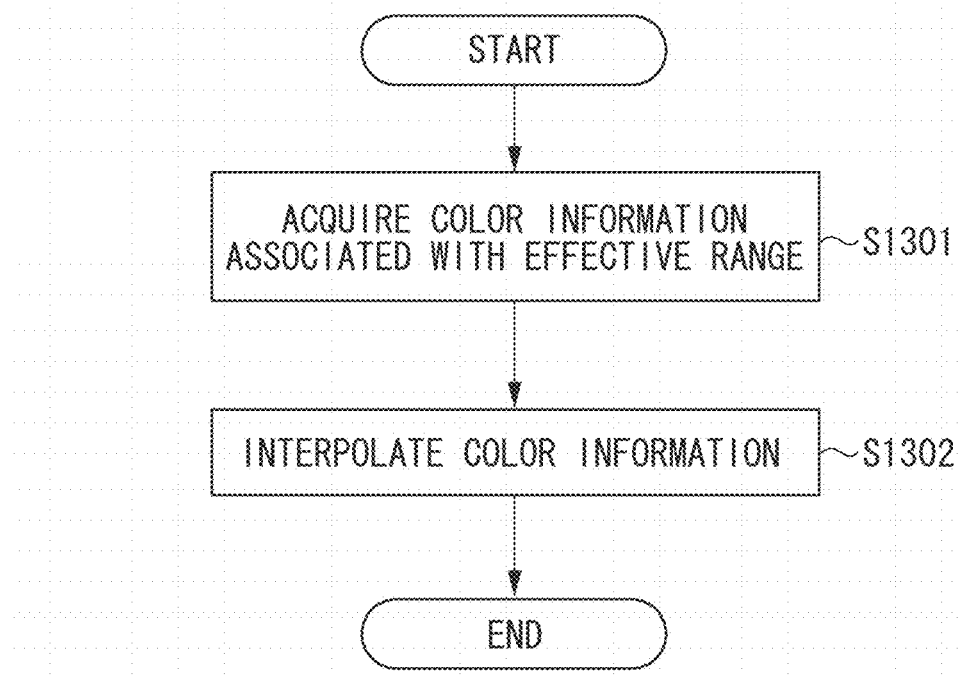
FIG. 13 is a flowchart illustrating a second example of the flesh color registration processing.

FIG. 13 is a flowchart illustrating an example of a flow of flesh color registration processing executed by the information processing apparatus 4000. For example, the processing illustrated in the flowchart of FIG. 13 is executed instead of the processing in steps S301 to S304 in FIG. 3.

In step S1301, the color information interpolation unit 4010 acquires color information associated with an effective range. An example of a generation method of color information to be acquired will be described below.

Next, in step S1302, the color information interpolation unit 4010 executes interpolation processing on the color information acquired in step S1301 to generate new color information associated with a new effective range. The interpolation processing will be described below.

Figure 14:
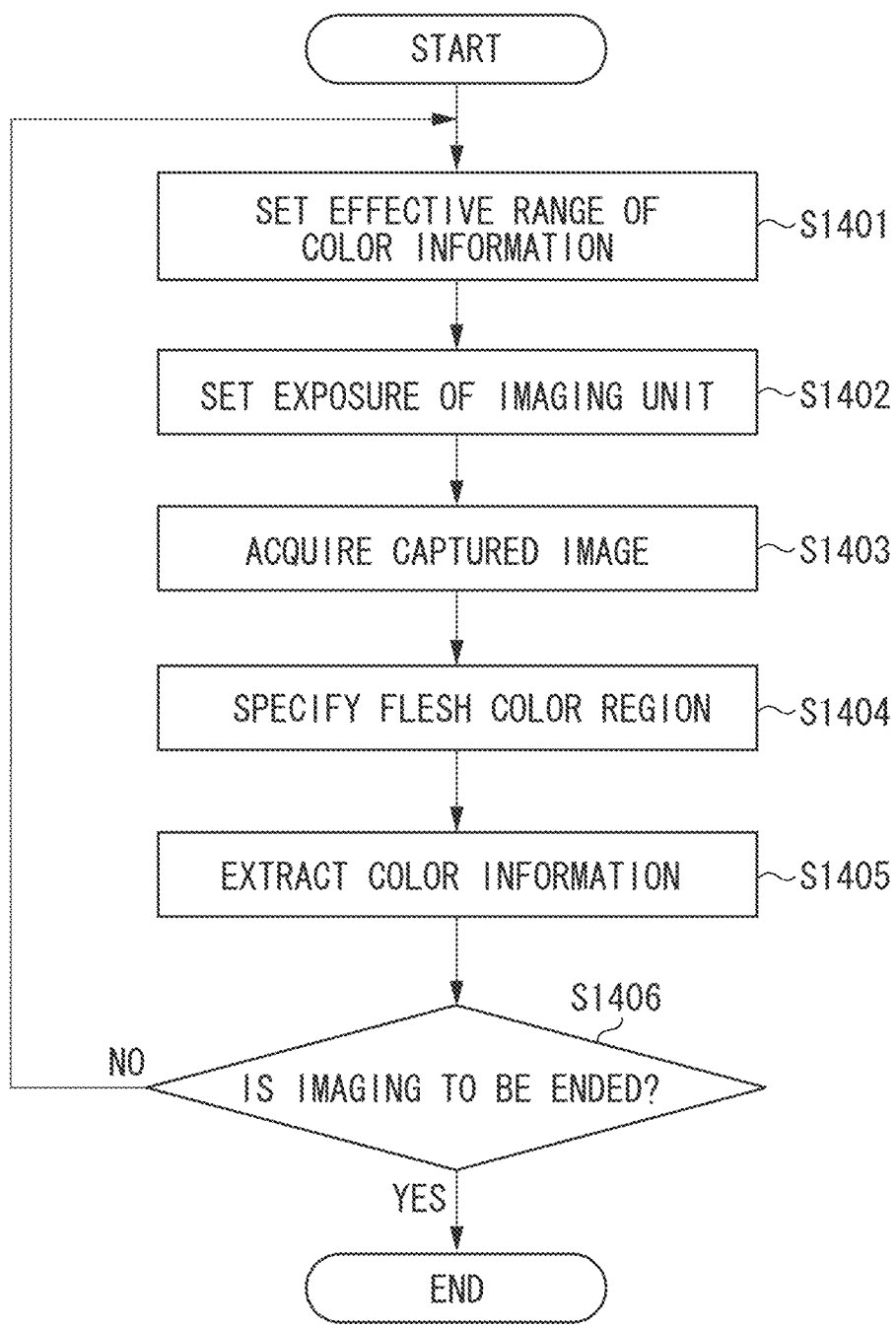
FIG. 14 is a flowchart illustrating an example of color information generation processing executed by a color information interpolation unit.

FIG. 14 is a flowchart illustrating an example of a flow of generation processing with respect to the color information acquired in step S1301.

In step S1401, the effective range calculation unit 1210 sets (acquires or calculates) an effective range of the color information acquired in step S1405 described below. For example, the effective range calculation unit 1210 acquires a pixel position in an image from the input unit 200 as an effective range of the color information. Alternatively, the effective range calculation unit 1210 may acquire the pixel position by in advance setting to the data storage unit 1020 a pixel position indicating the effective range. Further alternatively, the effective range calculation unit 1210 may acquire the number of pixels of an image captured by the imaging unit 100 and setting information indicating a rough effective range such as "central portion" or "edge portion" from the input unit 200 or the data storage unit 1020 to calculate a pixel position as an effective range of the color information based on these pieces of information.

Next, in step S1402, the effective range calculation unit 1210 calculates an exposure of the imaging unit 100 based on the effective range calculated in step S1401 and sets the exposure of the imaging unit 100 through an imaging control unit (not illustrated). An exposure setting method will be described below.

Next, in step S1403, similar to the first exemplary embodiment, the image acquisition unit 1010 acquires a captured image from the imaging unit 100 and stores the captured image in the data storage unit 1020.

Next, in step S1404, similar to the first exemplary embodiment, the flesh color region setting unit 1030 sets a flesh color region.

Next, in step S1405, similar to the first exemplary embodiment, the pixel information extraction unit 1040 extracts color information of the pixel included in the flesh color region set in step S1404.

Next, in step S1406, a user determines whether to end the imaging operation and gives an instruction to the information processing apparatus 4000 via the input unit 200. Alternatively, the number of times of imaging operation may be in advance set, so that the information processing apparatus 4000 may determine whether to end the imaging operation based on whether imaging operation of the set number of times has been executed. As a result of the determination, if the imaging operation is to be ended (YES in step S1406), the processing illustrated in the flowchart of FIG. 14 is ended. On the other hand, if the imaging operation is to be continued (NO in step S1406), the processing returns to step S1401, and the processing in steps S1401 to S1406 is executed repeatedly until it is determined that the imaging operation is to be ended.

Through the above-described processing, a plurality of pieces of color information associated with the effective range can be generated. In addition, the present exemplary embodiment is not limited to the exemplary embodiment in which color information is generated according to the flowchart in FIG. 14, and the color information may be generated through an optional method. For example, color information may be extracted from a captured image having a correct exposure at the center of the image plane and a captured image having a correct exposure at the edge of the image plane, and these information may be used as color information that indicates the center of the image plane as an effective range and color information that indicates the edge of the image plane as an effective range. Further, color information generated outside the information processing apparatus 4000 may be acquired through the input unit 200.

FIG. 15 is a graph illustrating a relationship between a distance from the center of an image plane and a shading coefficient. The shading refers to a luminance unevenness in an image plane. Hereinafter, description will be given in which luminance at each pixel position is used as a shading coefficient by setting the luminance at the center of the image plane as 1.0. Hereinafter, an exposure calculation method executed by the effective range calculation unit 1210 will be described with reference to FIG. 15. First, the effective range calculation unit 1210 calculates a distance from the center of the image plane with respect to the center of the effective range set in step S1401, and calculates a shading coefficient "s" in that distance. Then, the effective range calculation unit 1210 calculates an exposure of the imaging unit 100 by multiplying the correct exposure by the shading coefficient "s". The exposure calculation method executed by the effective range calculation unit 1210 has been described as the above.

Figure 16A:
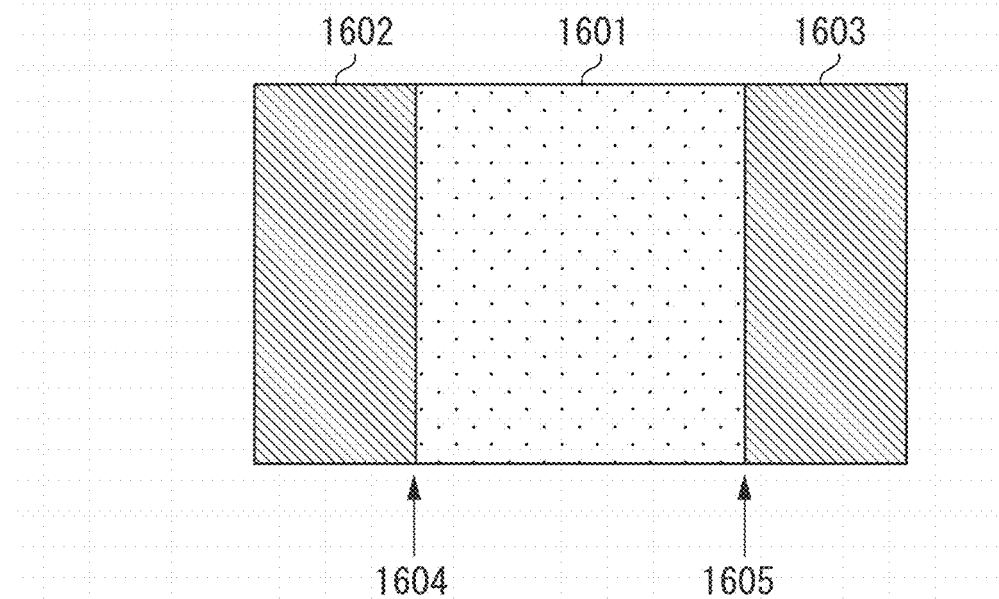
FIGS. 16A and 16B are diagrams schematically illustrating an effective range of color information.
Figure 16B:
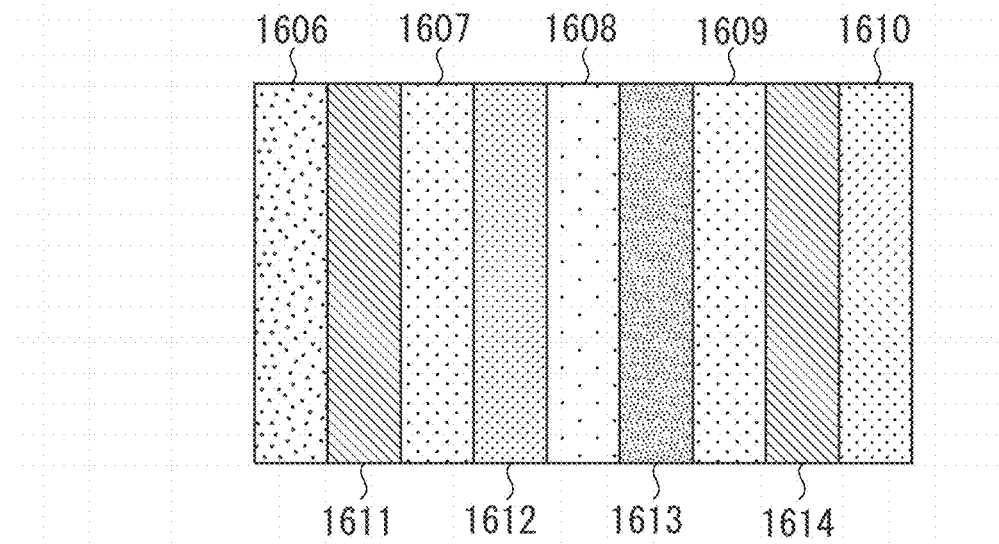
Figure 17A:
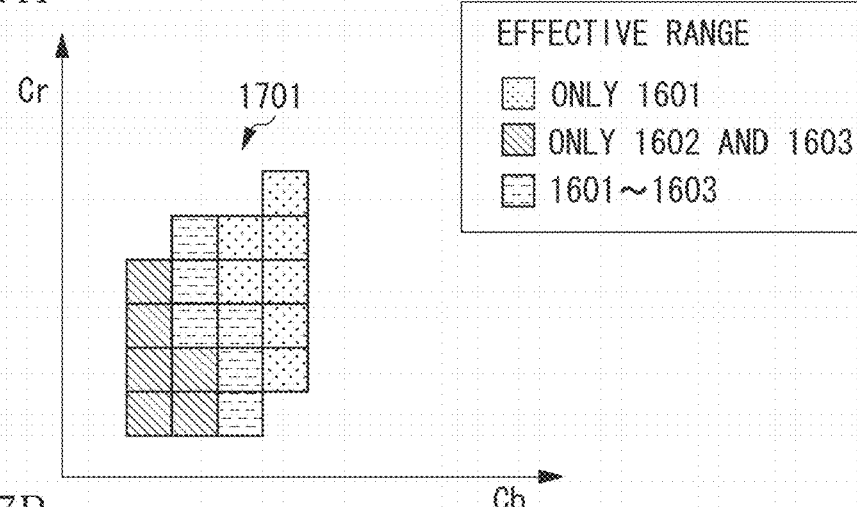
FIGS. 17A, 17B, and 17C are graphs schematically illustrating color information before interpolation processing executed by the color information interpolation unit.
Figure 17B:
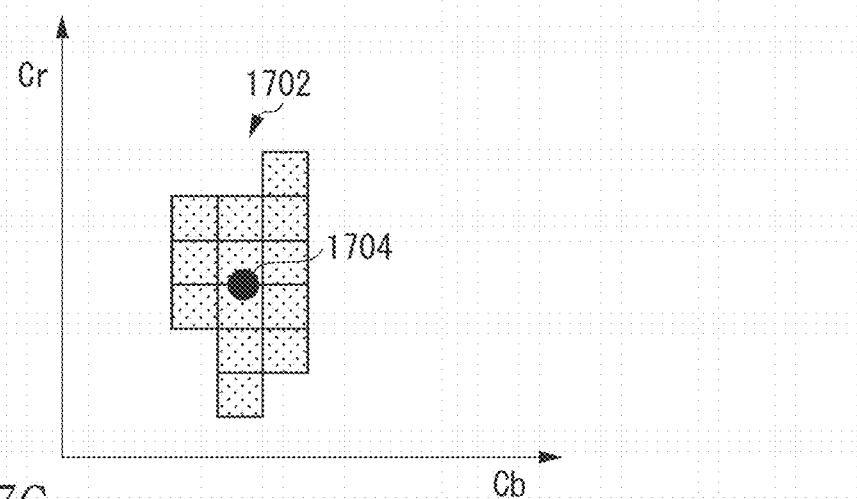
Figure 17C:
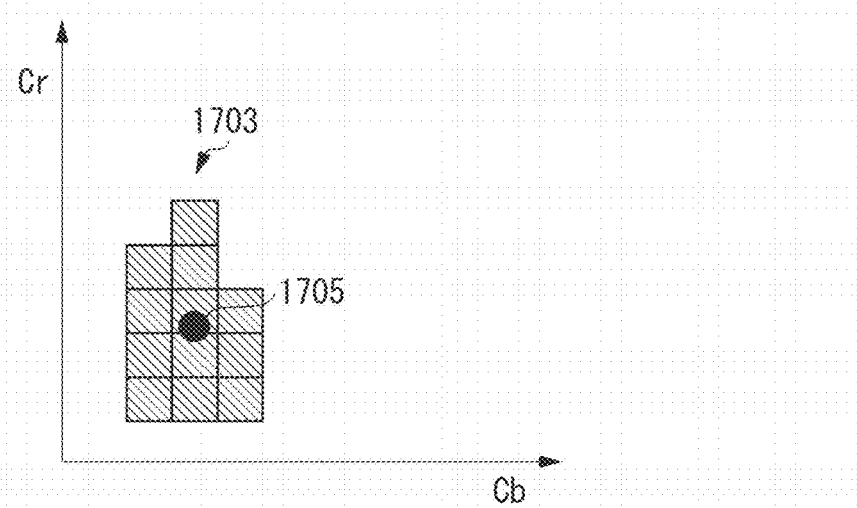

FIGS. 16A and 16B are diagrams schematically illustrating examples of an effective range of color information. FIG. 16A illustrates effective ranges 1601 to 1603 of color information set in step S1401 and boundaries 1604 and 1605 thereof. Further, FIG. 16B illustrates effective ranges 1606 to 1614 of new color information set by the color information interpolation unit 4010. Further, FIGS. 17A, 17B, and 17C are graphs schematically illustrating examples of the color information set in step S1401. FIG. 17A is a graph illustrating an entire portion of color information 1701 set in step S1401. FIG. 17B is a graph illustrating color information 1702 corresponding to the effective range 1601 from among the color information 1701. FIG. 17C is a graph illustrating color information 1703 corresponding to the effective rages 1602 and 1603.

When a flesh color region of an object is detected by using the above color information 1701 to 1703, a detection result is significantly different in the regions on the right and left sides of the boundaries 1604 and 1605 if the color information 1702 corresponding to the effective range 1601 and the color information 1703 corresponding to the effective ranges 1602 and 1603 are significantly different from each other. In order to solve this problem, in the present exemplary embodiment, color information corresponding to more precisely-divided effective ranges such as effective ranges 1606 to 1614 in FIG. 16B are generated by executing interpolation processing on the color information 1702 and 1703.

FIG. 18 is a flowchart illustrating an example of a flow of interpolation processing executed by the color information interpolation unit 4010. In step S1801, the color information interpolation unit 4010 calculates centroids 1704 and 1705 of the color information 1702 and 1703. For example, when the color information is expressed by a CbCr color space, a coordinate value in the CbCr color space is calculated as a centroid of the color information.

Next, in step S1802, the color information interpolation unit 4010 arranges each color of the color information 1702 and 1703 in an order of a distance closer to the centroid 1704 or 1705 calculated in step S1801.

Next, in step S1803, the color information interpolation unit 4010 refers to one effective range from among the effective ranges 1606 to 1614. Herein, the effective range referred to in step S1803 is named as a reference effective range as necessary.

Next, in step S1804, the color information interpolation unit 4010 acquires a shading coefficient of the effective range referred to in step S1803. The shading coefficient can be acquired from the information indicating a relationship between a distance from the center of the image plane and a shading coefficient described in step S1402 (see FIG. 15). In addition, the present exemplary embodiment is not limited to an exemplary embodiment in which a value corresponding to the shading of an actual image is acquired as a shading coefficient. For example, a shading coefficient of an effective range corresponding to the center of the image plane may be set as "1", whereas a shading coefficient of an effective range corresponding to the edge of the image plane may be set as "0 (zero)".

Next, in step S1805, the color information interpolation unit 4010 calculates interpolation ratios of the color information 1702 and 1703 based on the shading coefficients acquired in step S1804. For example, the interpolation ratios r1 and r2 of the respective color information 1702 and 1703 can be calculated by the following formulas 1 and 2 when the shading coefficient of the reference effective range is "s", the shading coefficient of the effective range 1601 is "s1", and the shading coefficient of the effective ranges 1602 and 1603 is "s2".

$$r1=(s1-s2)/(s1-s2) \quad \text{Formula 1}$$

$$r2=1-r1 \quad \text{Formula 2}$$

Next, in step S1806, the color information interpolation unit 4010 combines the pieces of color information of the effective ranges 1601 and 1602 based on the interpolation ratios r1 and r2 calculated in step S1805, and generates color information corresponding to the reference effective range referred to in step S1803.

Next, in step S1807, the color information interpolation unit 4010 determines whether all of the effective ranges 1606 to 1614 have been referred to. As a result of the determination, if not all of the effective ranges 1606 to 1614 have been referred to (NO in step S1807), the processing returns to step S1803, and the color information interpolation unit 4010 refers to an effective range that has not been referred to, from among the effective ranges 1606 to 1614. Then, the processing in steps S1803 to S1807 is executed repeatedly until all of the effective ranges 1606 to 1614 are referred to. Then, after the processing in steps S1803 to S1806 is executed on all of the effective ranges 1606 to 1614 as processing targets, the processing illustrated in the flowchart of FIG. 18 is ended.

FIG. 19 is a flowchart illustrating an example of a flow of combining processing executed in step S1806.

In step S1901, the color information interpolation unit 4010 refers to one of the color information 1702 and 1703 before combination.

Next, in step S1902, the color information interpolation unit 4010 extracts a color from the color information referred to in step S1901 according to the interpolation ratio r1 or r2 calculated in step S1805. Hereinafter, description of an exemplary embodiment will be given in which the color information 1702 is referred to in step S1901. The interpolation ratio of the color information 1702 is "r1". Accordingly, the color information interpolation unit 4010 extracts colorsr1−times the total number of colors included in the color information 1702 in the order arranged in step S1802 (i.e., in an order closer to the centroid). The same processing will be executed when the color information 1703 is referred to in step S1902. In this case, the interpolation ratio r2 will be used instead of the interpolation ratio r1.

Through the above-described processing, it is possible to extract colors in the order from the most important color (a color closest to the centroid) according to the interpolation ratio r1 or r2. Color extraction processing according to the present exemplary embodiment is not limited to the above. For example, when the colors are extracted from certain color information, the colors may be extracted in the order of distance closer to the centroid of another color information instead of the order of distance closer to the centroid of the one color information. When the color extraction processing is executed as described above, even if the color information before combination are distant from each other in the color space, interpolation can be executed so as to link both color information.

Next, in step S1903, the color information interpolation unit 4010 determines whether all of the color information 1702 and 1703 before combination has been referred to. As a result of the determination, if all of the color information 1702 and 1703 before combination has been referred to (YES in step S1903), the processing proceeds to step S1904.

On the other hand, if not all of the color information 1702 and 1703 before combination has been referred to (NO in step S1903), the processing returns to step S1901, and the color information interpolation unit 4010 refers to color information that has not been referred to from among the color information 1702 and 1703 before combination. Then, the processing in steps S1901 to S1903 is executed repeatedly until all of the color information 1702 and 1703 before combination has been referred to.

Next, in step S1904, the color information interpolation unit 4010 calculates combined color information by taking a logical sum of the colors extracted from the color information 1702 and 1703 in step S1902. Through the above processing, it is possible to generate the color information that is interpolated by the interpolation ratio based on the shading coefficient.

In addition, in step S1902, if a color already extracted from another color information is extracted repeatedly, the number of colors of the combined color information is less than the number of colors of the color information 1702 and 1703 before combination. Therefore, it is desirable to extract the colors without doing such repetition. However, the colors are not necessarily to be extracted without doing the repetition. It is also possible that the colors are extracted repeatedly.

Further, in the present exemplary embodiment, the registration processing is also executed by the flesh color registration unit 1060. However, in the present exemplary embodiment, the effective range calculated by the color information interpolation unit 4010 for each color information is stored in the data storage unit 1020 instead of the effective range calculated by the effective range calculation unit 1050 for each color information.

Further, in the present exemplary embodiment, although description has been given in which two pieces of color information are interpolated. However, the number of pieces of color information to be interpolated is not limited thereto. For example, more pieces of color information can be generated by interpolating two or more pieces of color information. Further, in an exemplary embodiment, which new color information is generated through extrapolation instead of interpolation.

As described above, according to the present exemplary embodiment, color information corresponding to more finely-divided ranges can be calculated by interpolating the color information acquired in advance. With this processing, it is possible to reduce occurrence of a phenomenon in which detection results are significantly different between the right and left regions of a boundary of the effective ranges when the flesh color region is detected.

It is to be noted that configurations described in the second and the third exemplary embodiments can be employed also in the present exemplary embodiment.

In the above-described exemplary embodiments, description has been given in which a flesh color is detected as a color of the object. However, the color is not limited to the flesh color. A color to be detected is appropriately determined according to the object.

The above-described exemplary embodiments are merely examples, and shall not be construed as limiting the technical range of the present invention. In other words, the present invention can be realized in diverse ways without departing from the technical spirit or main features of the present invention.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209843, filed Oct. 26, 2015, and No. 2016-008941, filed Jan. 20, 2016, which are hereby incorporated by reference herein in their entirety.

What is claimed is:
1. An information processing apparatus comprising:
at least one memory storing executable instructions; and
at least one processor coupled to the at least one memory and executing the executable instructions to cause the information processing apparatus to provide:
an effective range setting unit configured to set an effective range of color information with respect to color information extracted from an image of an object captured by an imaging unit;

a color region extraction unit configured to extract a color region corresponding to the color information from another captured image that is different from the captured image from which the color information is extracted by regarding a region of the color information which is extracted from the effective range in the another captured image as the color region; and a position derivation unit configured to derive a position of the object within an image plane of the next imaging operation based on a dispersion of the effective range of each of the color information.

2. The information processing apparatus according to claim 1, further comprising a display unit configured to display a combined image on a display apparatus by combining information indicating the color region extracted by the color region extraction unit, with the captured image.

3. The information processing apparatus according to claim 1, further comprising a depth derivation unit configured to derive a depth from the imaging unit with respect to the color region extracted by the color region extraction unit for each of the captured images, and to derive a range of depth from the imaging unit which is effective for extracting a color, based on the derived depth.

4. The information processing apparatus according to claim 1, wherein the color is a flesh color.

5. The information processing apparatus according to claim 1, further comprising a combining unit configured to combine the another captured image and a computer graphic (CG) based on the color region extracted by the color region extraction unit.

6. The information processing apparatus according to claim 1, further comprising a color information extraction unit configured to extract the color information from the image of the object captured by the imaging unit, wherein, based on the color information extracted by the color information extraction unit and positions of pixels having the color information, the effective range setting unit sets an effective range of the color information with respect to each of the color information.

7. The information processing apparatus according to claim 6, further comprising:

an output unit configured to output information indicating the position derived by the position derivation unit, wherein, when the information indicating the position is output by the output unit, the color information extraction unit extracts the color information from an image of an object captured by the imaging unit after the output.

8. The information processing apparatus according to claim 6, wherein the effective range setting unit further comprises:

a region determination unit configured to determine whether the color information extracted by the color information extraction unit exists in a region set to the captured image; and a relationship derivation unit configured to derive at least any one of a relationship between information indicating positions in the captured image and a number of pixels with respect to pixels inside a region set to the captured image, and a relationship between information indicating positions in the captured image and a number of pixels with respect to pixels outside the region set to the captured image for each of the color information, wherein, based on the relationship derived by the relationship derivation unit, the effective range acquisition unit derives the effective range of color information with respect to each of the color information.

9. The information processing apparatus according to claim 8, wherein the relationship derivation unit derives a relationship between information indicating positions in the captured image and a number of pixels with respect to pixels inside a region set to the captured image, and a relationship between information indicating a position in the captured image and a number of pixels with respect to pixels outside the region set to the captured image for each of the color information, and wherein, based on a result of comparison between the relationship between information indicating positions in the captured image and a number of pixels with respect to pixels inside a region set to the captured image, and the relationship between information indicating positions in the captured image and a number of pixels with respect to pixels outside the region set to the captured image, the effective range acquisition unit derives the effective range of the color information for each of the color information.

10. The information processing apparatus according to claim 6, further comprising a generation unit configured to generate new color information of a number greater than a number of the color information, which makes a part of a region in the captured image as new effective ranges of a number greater than a number of the effective ranges, by using the color information extracted by the color information extraction unit, the effective ranges of which are acquired by the effective range acquisition unit.

11. The information processing apparatus according to claim 10, wherein, by executing processing including processing for interpolating a plurality of pieces of color information extracted by the color information extraction unit, effective ranges of which are set by the effective range acquisition unit, the generation unit generates the new color information of a number greater than a number of the color information, which makes a part of a region in the captured image as new effective ranges of a number greater than a number of the effective ranges.

12. The information processing apparatus according to claim 11, wherein the generation unit interpolates the plurality of pieces of color information with an interpolation ratio based on shading of the captured image.

13. An information processing method comprising:

setting an effective range of color information with respect to color information extracted from an image of an object captured by an imaging unit;

extracting a color region corresponding to the color information from another captured image that is different from the captured image from which the color information is extracted by regarding a region of the color information which is extracted from the effective range in the another captured image as the color region; and deriving a position of the object within an image plane of the next imaging operation based on a dispersion of the effective range of each of the color information.

14. The information processing method according to claim 13, wherein the color is a flesh color.

15. A non-transitory computer readable storage medium storing a program that causes a computer to perform an information processing method, the information processing method comprising:

setting an effective range of color information with respect to the color information extracted from an image of an object captured by an imaging unit;

extracting a color region corresponding to the color information from another captured image that is different from the captured image from which the color information is extracted, based on the effective range of the color information by regarding a region of the color information which is extracted from the effective range in the another captured image as the color region; and deriving a position of the object within an image plane of the next imaging operation based on a dispersion of the effective range of each of the color information.

16. An information processing apparatus comprising:

at least one memory storing executable instructions; and at least one processor coupled to the at least one memory and executing the executable instructions to cause the information processing apparatus to provide:

an effective range acquisition unit configured to acquire an effective range of color information with respect to color information, wherein the effective range indicates a range in an image;

a color region extraction unit configured to extract a color region corresponding to the color information from a captured image by regarding a region of the color information which is extracted from the effective range in the image as the color region; and a position derivation unit configured to derive a position of the object within an image plane of the next imaging operation based on a dispersion of the effective range of each of the color information.

17. The information processing apparatus according to claim 16, wherein the color is a flesh color.

* * * * *